May 6, 1958  A. W. GARDINER ET AL  2,833,356
ENGINE CONTROLLER
Original Filed Sept. 7, 1949  12 Sheets-Sheet 6
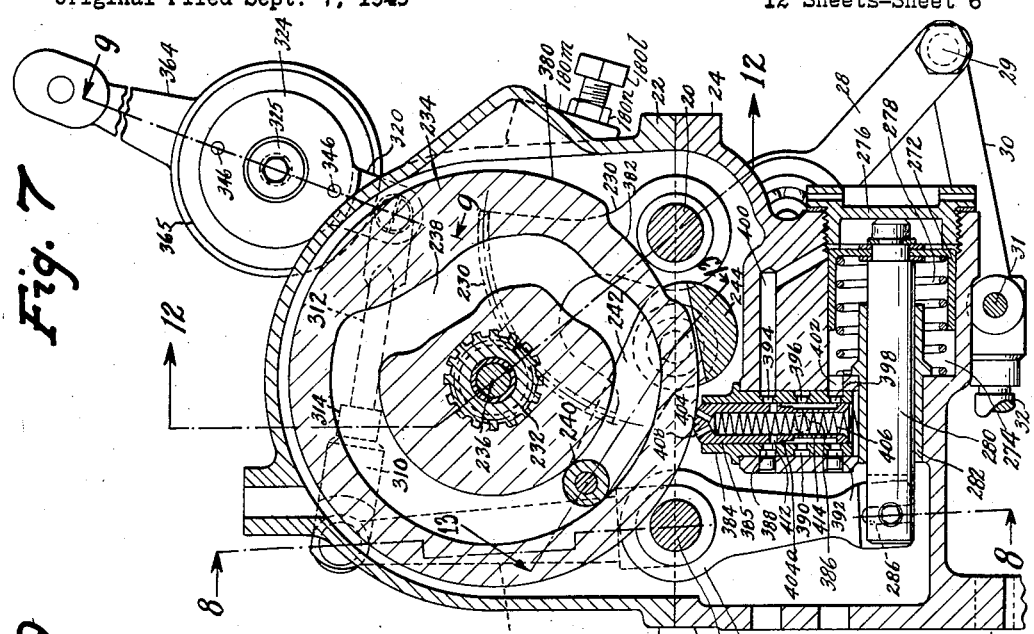
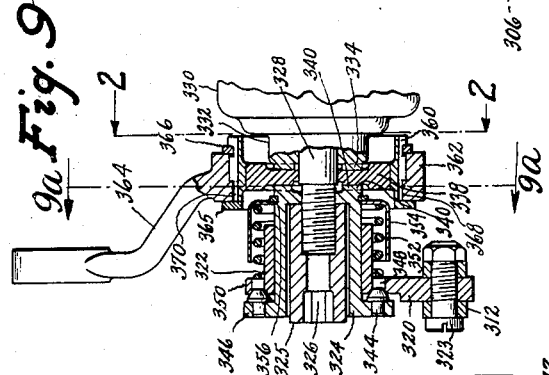
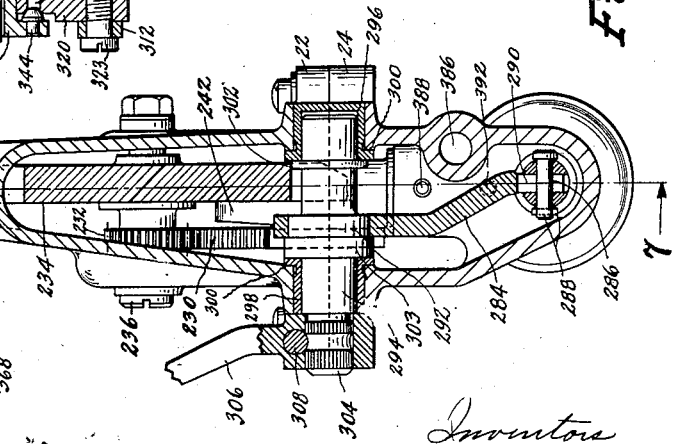
Inventors
JOHN DOLZA
ARTHUR W. GARDINER
ARTHUR W. GAUBATZ
WILLARD T. NICKEL
PETER W. PERISH
by Craig V. Morton
their attorneys

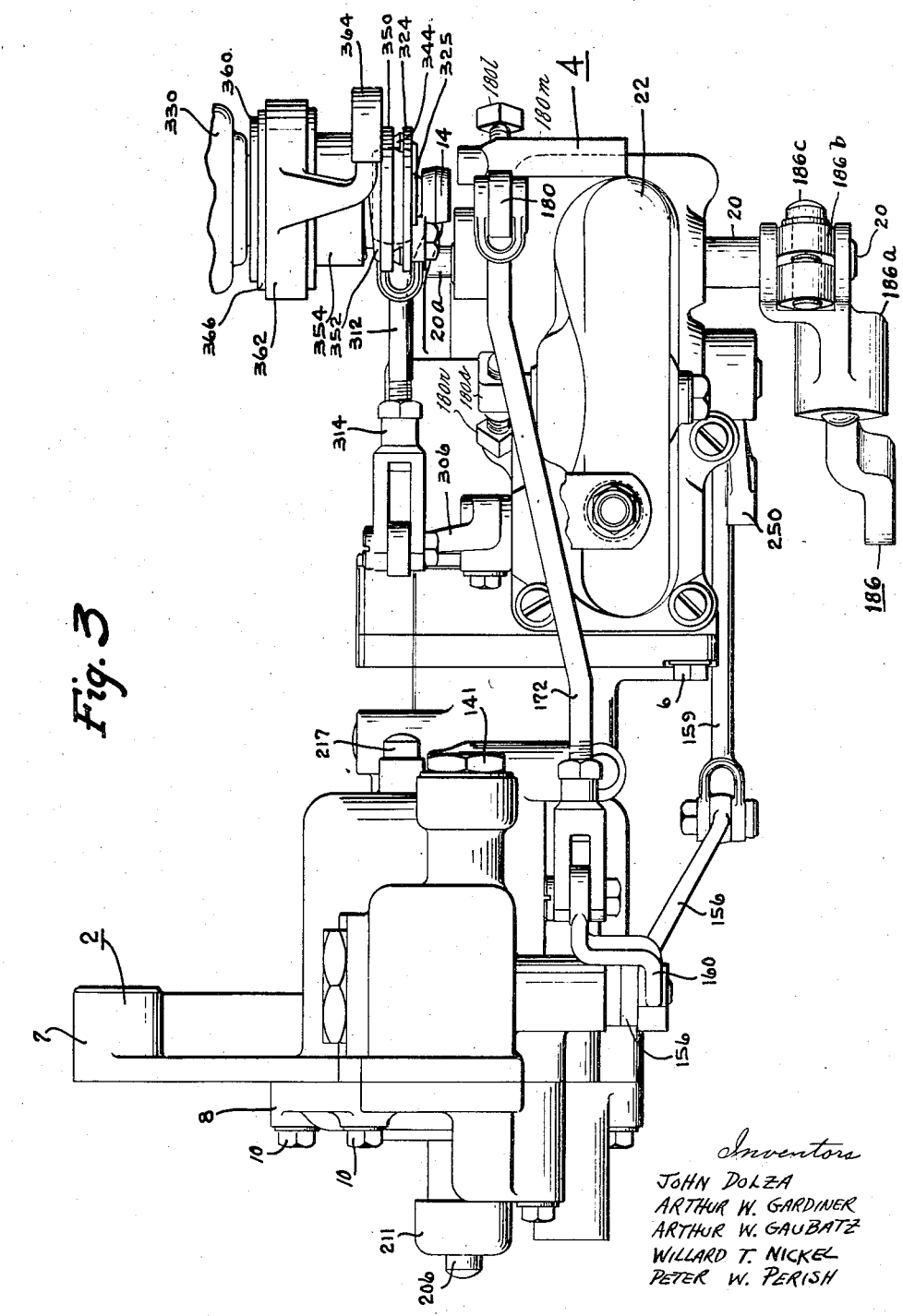

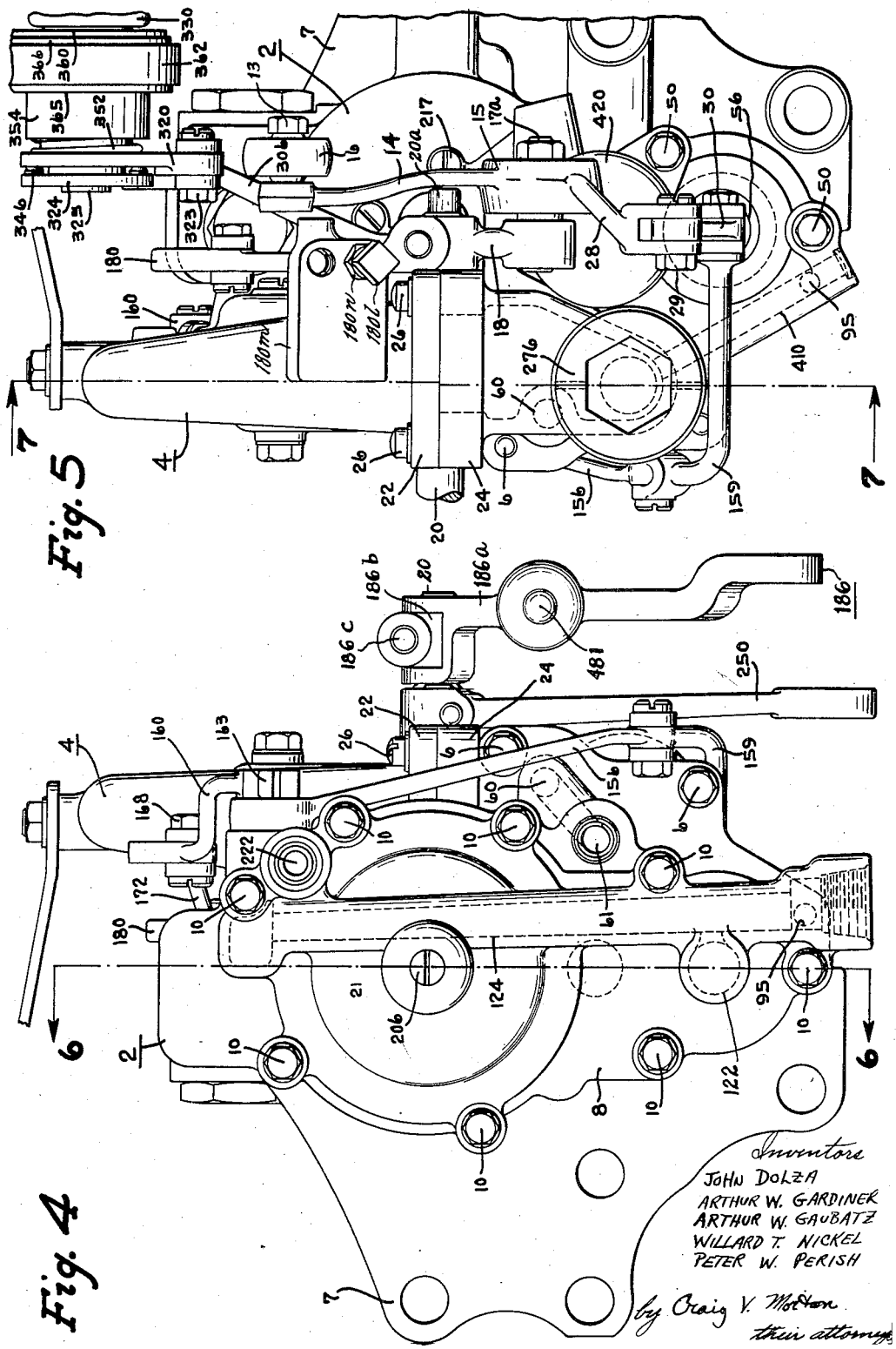

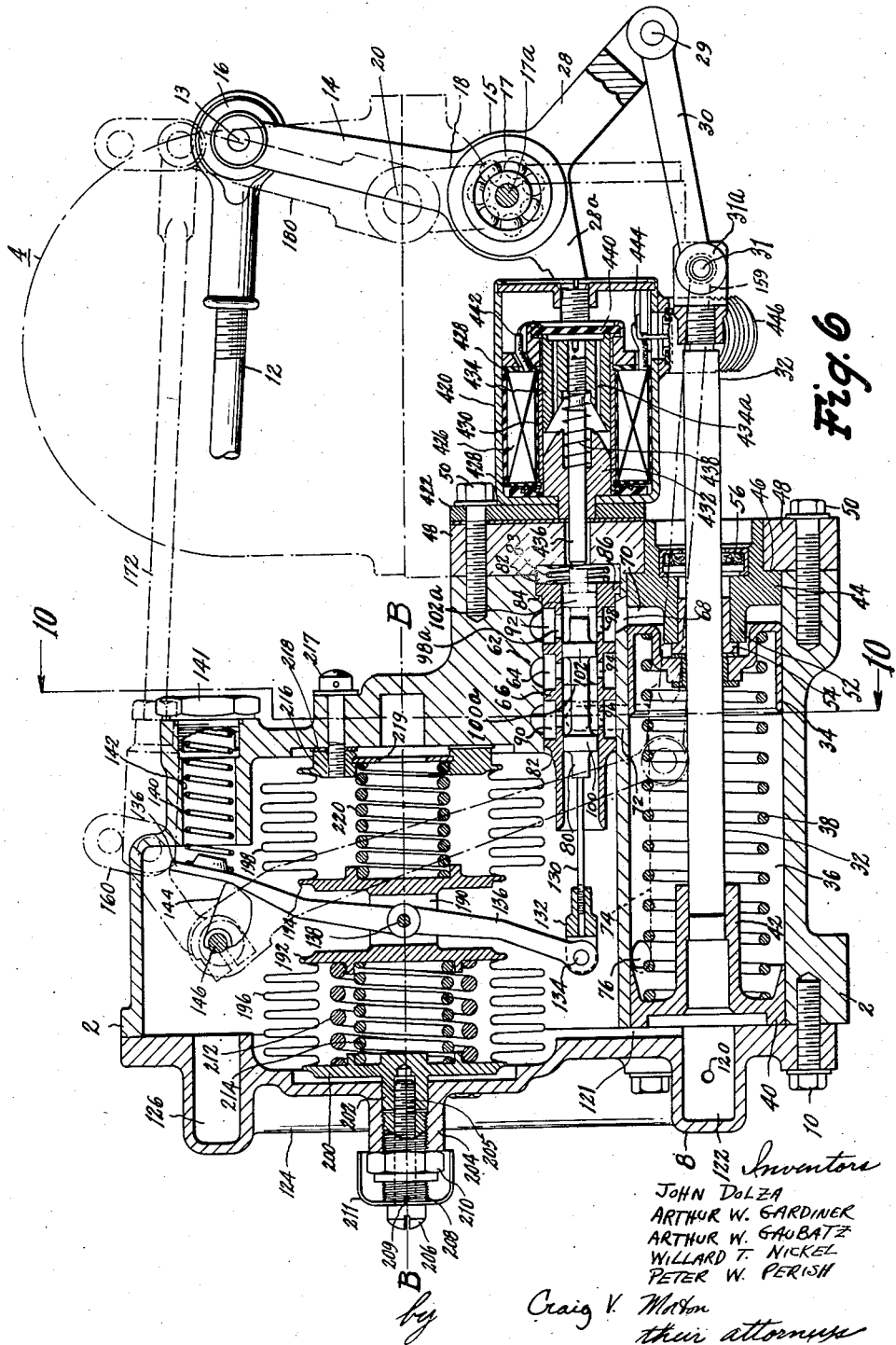

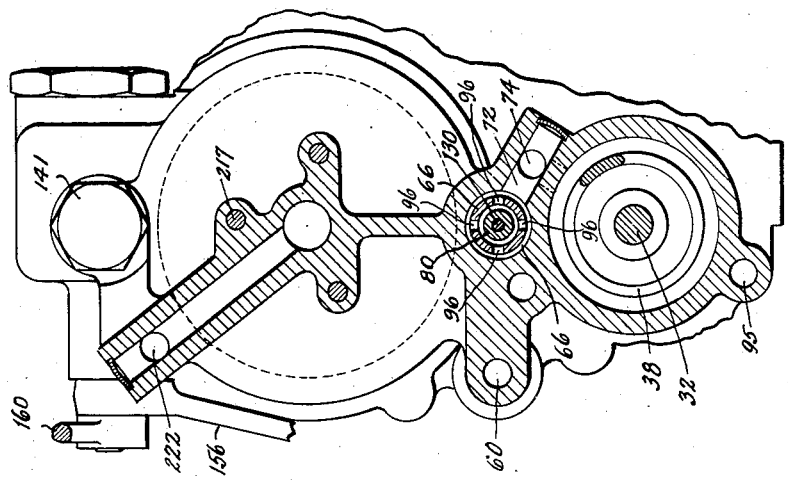
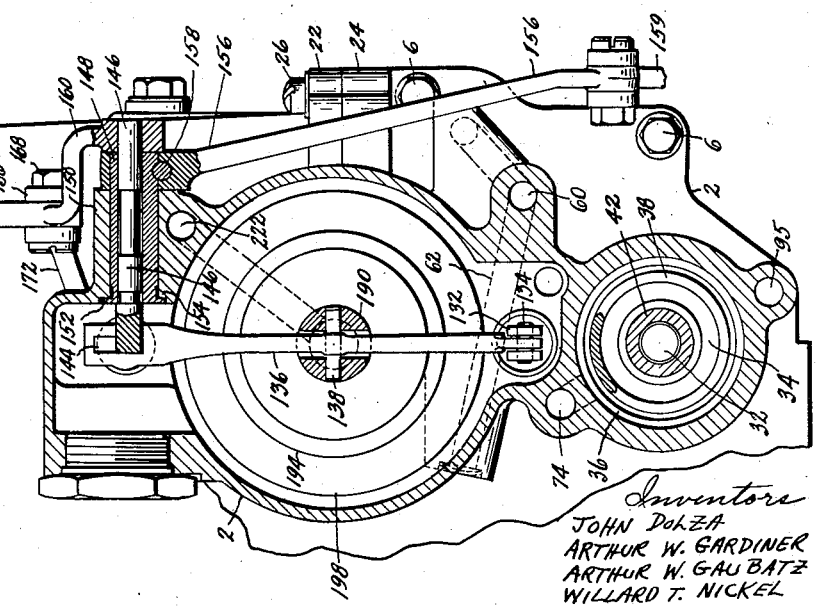

May 6, 1958  A. W. GARDINER ET AL  2,833,356
ENGINE CONTROLLER

Original Filed Sept. 7, 1949  12 Sheets-Sheet 8

Inventors
JOHN DOLZA
ARTHUR W. GARDINER
ARTHUR W. GAUBATZ
WILLARD T. NICKEL
PETER W. PERISH by Craig V. Morton
their attorneys

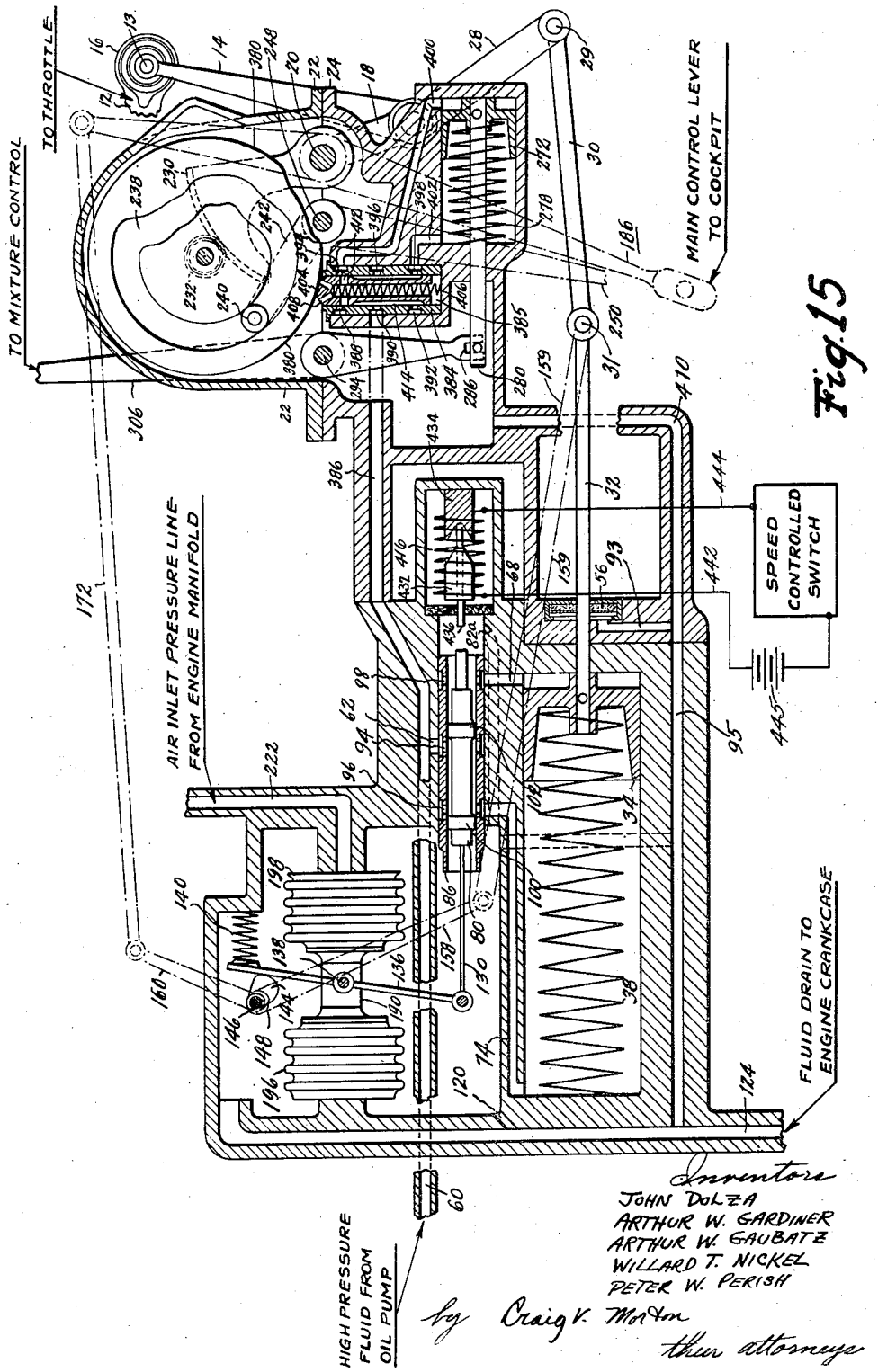

May 6, 1958 A. W. GARDINER ET AL 2,833,356
ENGINE CONTROLLER
Original Filed Sept. 7, 1949 12 Sheets-Sheet 10

Inventors
JOHN DOLZA
ARTHUR W. GARDINER
ARTHUR W. GAUBATZ
WILLARD T. NICKEL
PETER W. PERISH
by Craig V. Morton
their attorneys

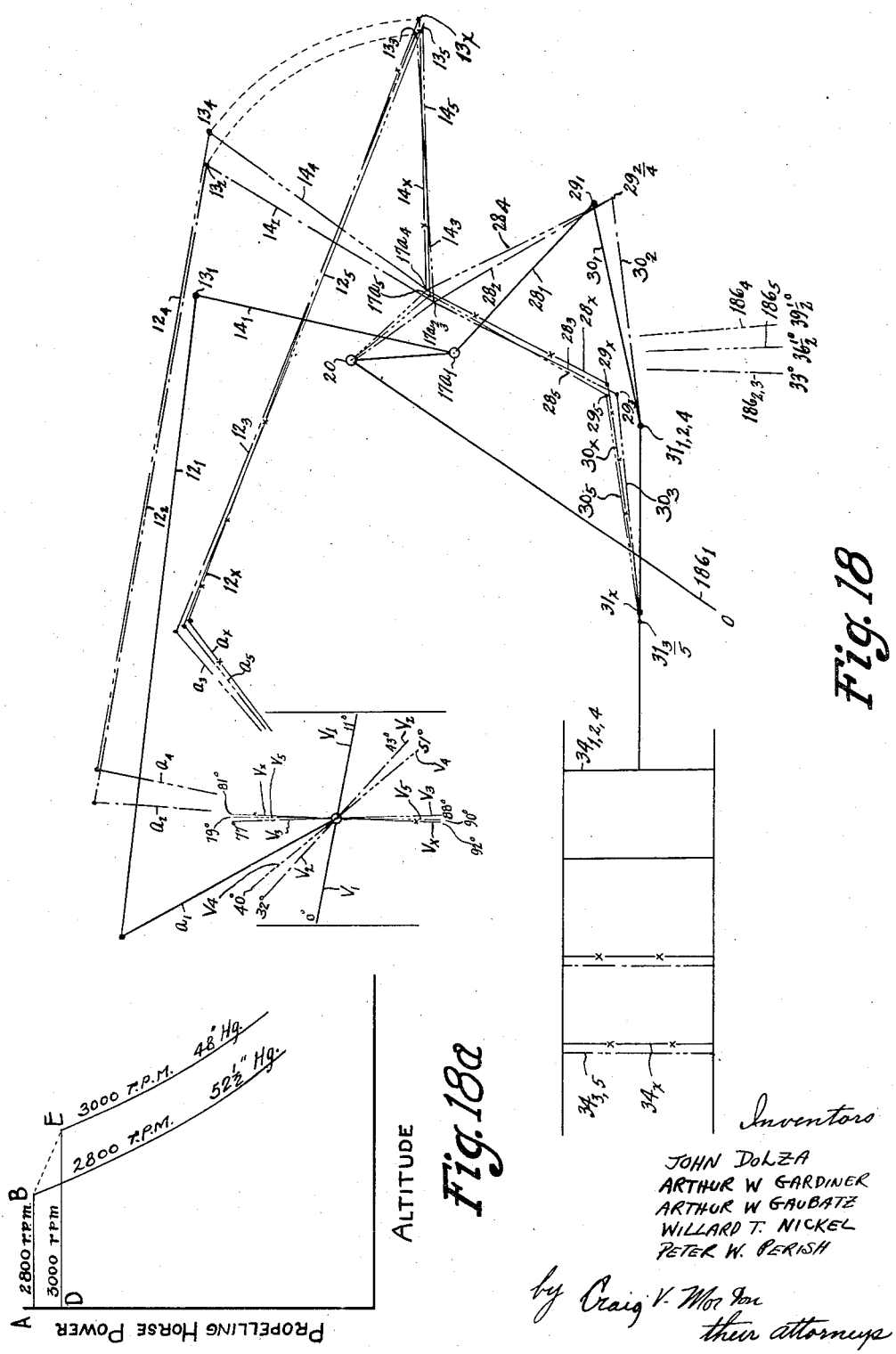

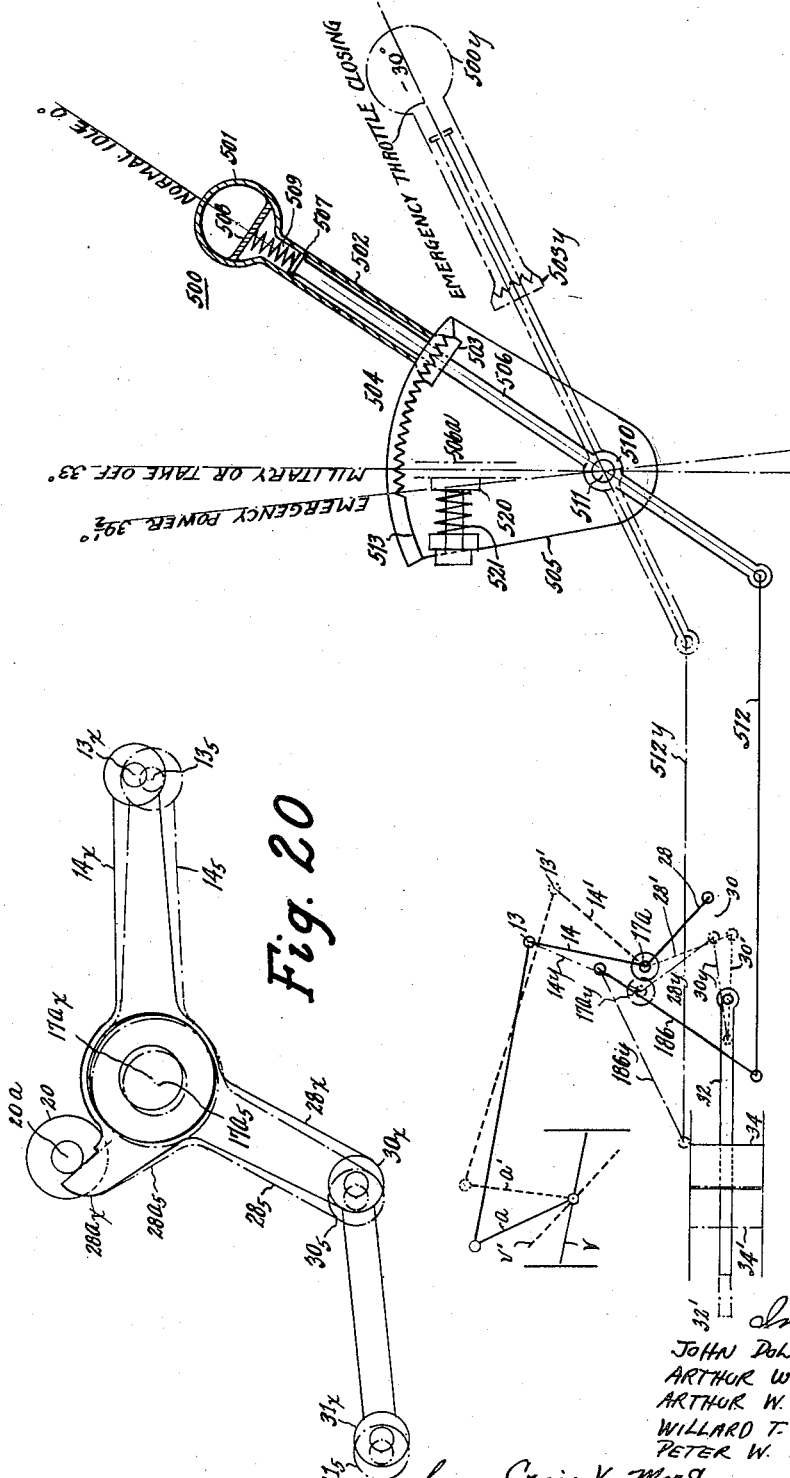

United States Patent Office 2,833,356
Patented May 6, 1958

2,833,356

ENGINE CONTROLLER

Arthur W. Gardiner and Arthur W. Gaubatz, Indianapolis Ind., Willard T. Nickel, Rochester, N. Y., and John Dolza, Davisburg, and Peter W. Perish, Flint, Mich., assignors to General Motors Corporation, Detroit, Mich., a corporation of Delaware Original application September 7, 1949, Serial No. 114,438, now Patent No. 2,708,426, dated May 17, 1955. Divided and this application February 25, 1955, Serial No. 490,508

3 Claims. (Cl. 170—135.74)

This invention relates to aircraft and the primary object is to render the operation of aircraft more safe and effective by simplifying the control of the engine and the propeller. More particularly, we aim to safeguard the engine from overboosting, from overspeeding and from improper setting of the carburetor for mixture strength.

This is a division of application S. N. 114,438, filed September 7, 1949, now Patent No. 2,708,426, which is a continuation-in-part of application S. N. 449,918, filed July 6, 1942, now abandoned.

To accomplish these objects, we provide an automatic engine controller comprising an automatic manifold pressure regulator which is manually controlled by a single control lever operated by the pilot for setting the pressure regulator to maintain a selected manifold pressure in predetermined relation to altitude. We provide means set by the control lever for adjusting mixture strength in coordinated relation to the selection of the manifold pressure. We provide means set by the control lever for controlling the setting of the propeller pitch adjuster whereby a certain engine or propeller R. P. M. is selected in coordinated relation to the selection of manifold pressure. The engine throttle valve is partly under direct control by the control lever and partly under control by the automatic pressure regulator, the control by the control lever being sufficient to control the throttle valve to make a takeoff or safe landing. We provide speed responsive means operating through the automatic pressure regulator for effecting a closing movement of the throttle valve when a certain engine or propeller speed is exceeded.

Further objects and advantages of the present invention will be apparent from the following description, reference being had to the accompanying drawings wherein a preferred embodiment of the present invention is clearly shown.

In the drawings:

Figure 3 is a plan view of the device;

Figure 4 is an end view looking in the direction of arrow 4 of Figure 1;

Figure 5 is an end view looking in the direction of arrow 5 of Figure 1;

Figure 6 is a view partly in vertical section on the line 6—6 of Figure 4, illustrating particularly the pressure-controlled mechanism for controlling the position of the carburetor throttle valve;

Figure 7 is a detail sectional view on the line 7—7 of Figure 5 showing a portion of the mechanism for controlling the mixture ratio and of the mechanism for controlling engine or propeller R. P. M. (speed).

Figure 1:
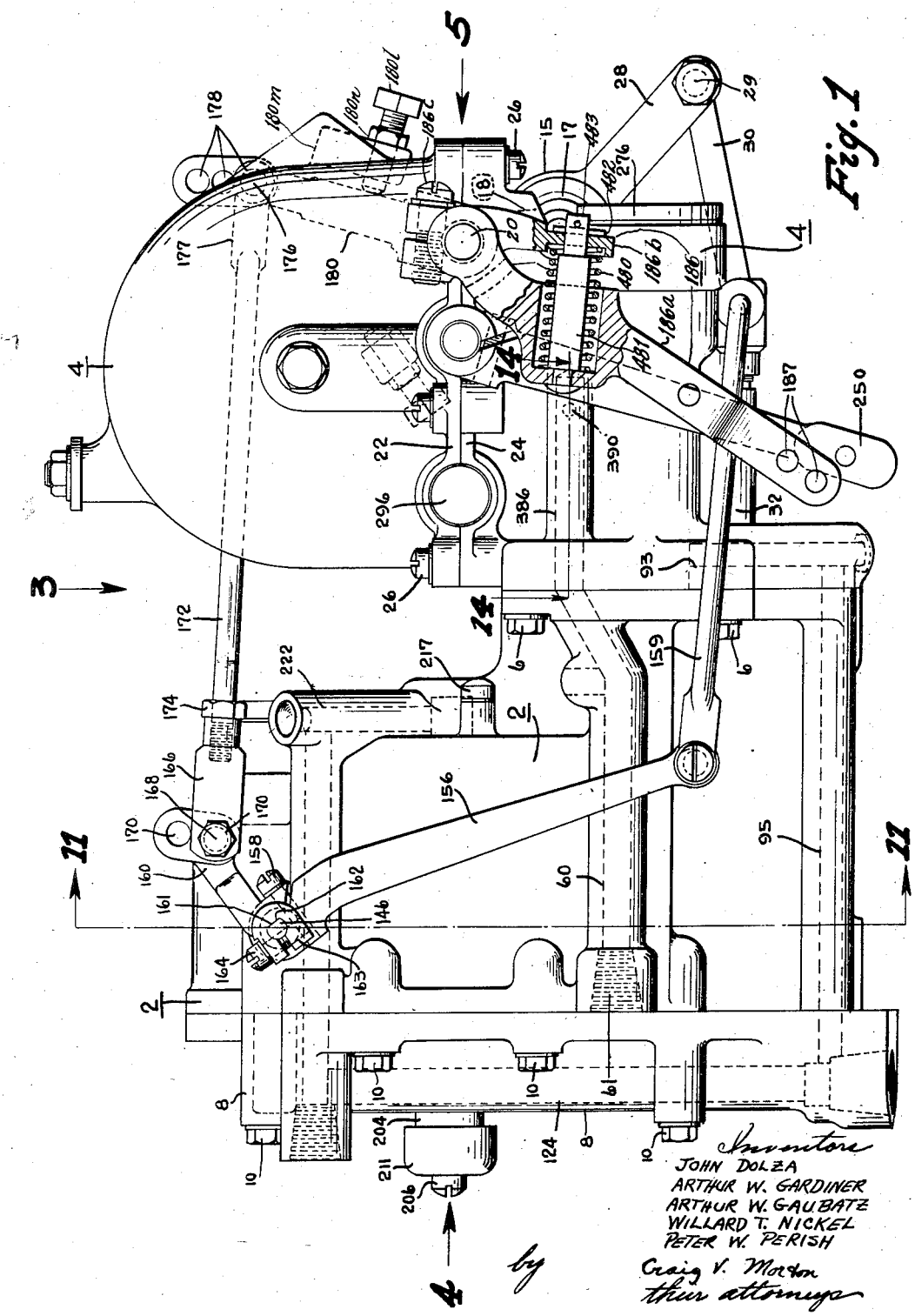
Figure 1 is a side elevation of the device.
Figure 14:
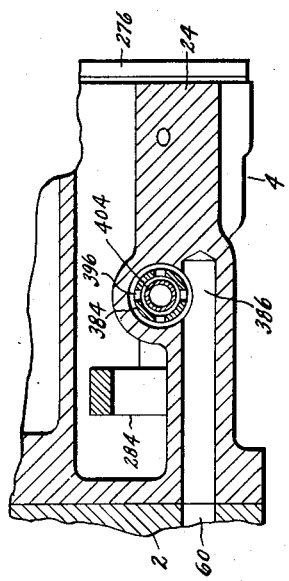
Figure 13:
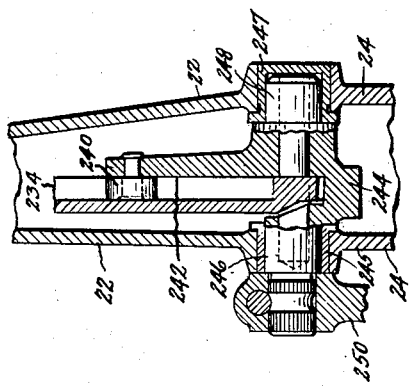
Figure 12:
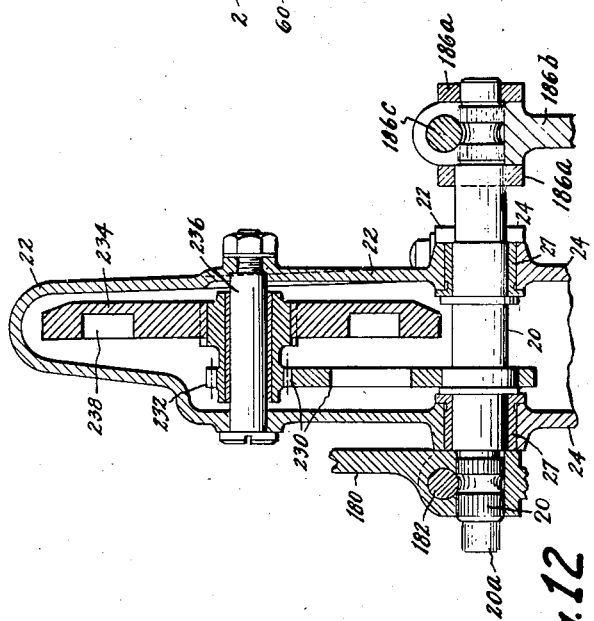
Figure 12A:
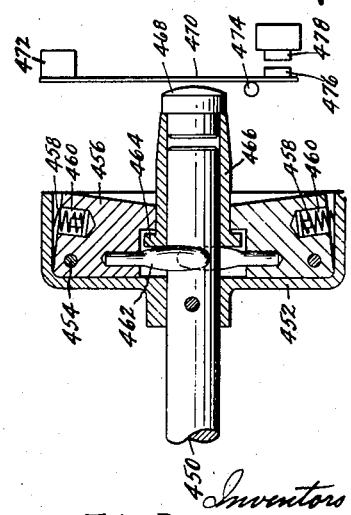
Figure 16:
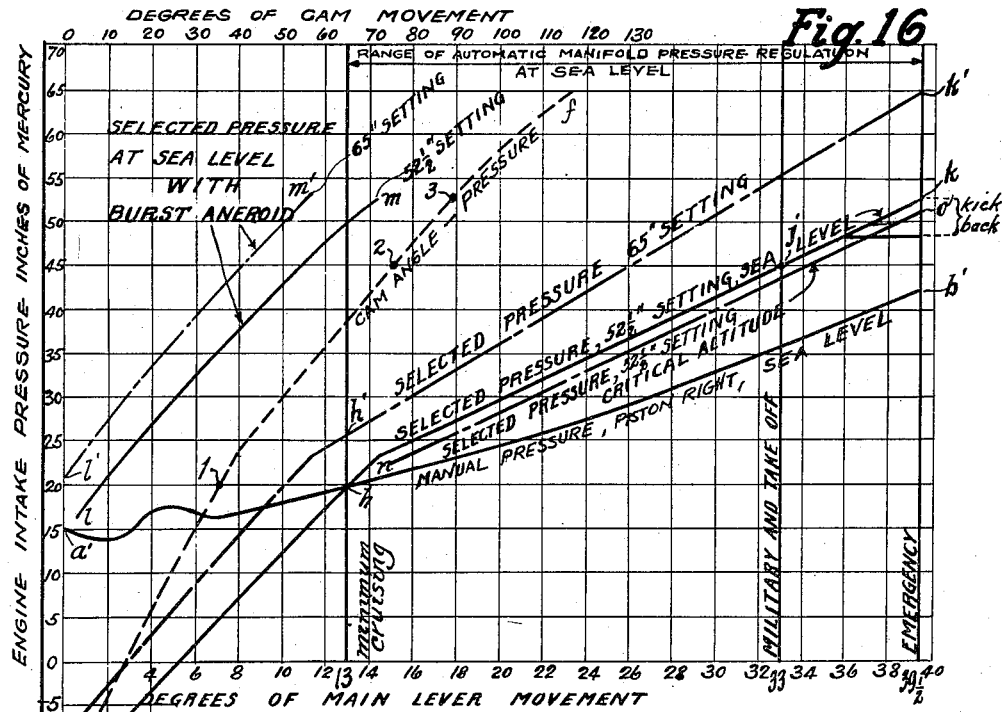
Figure 17:
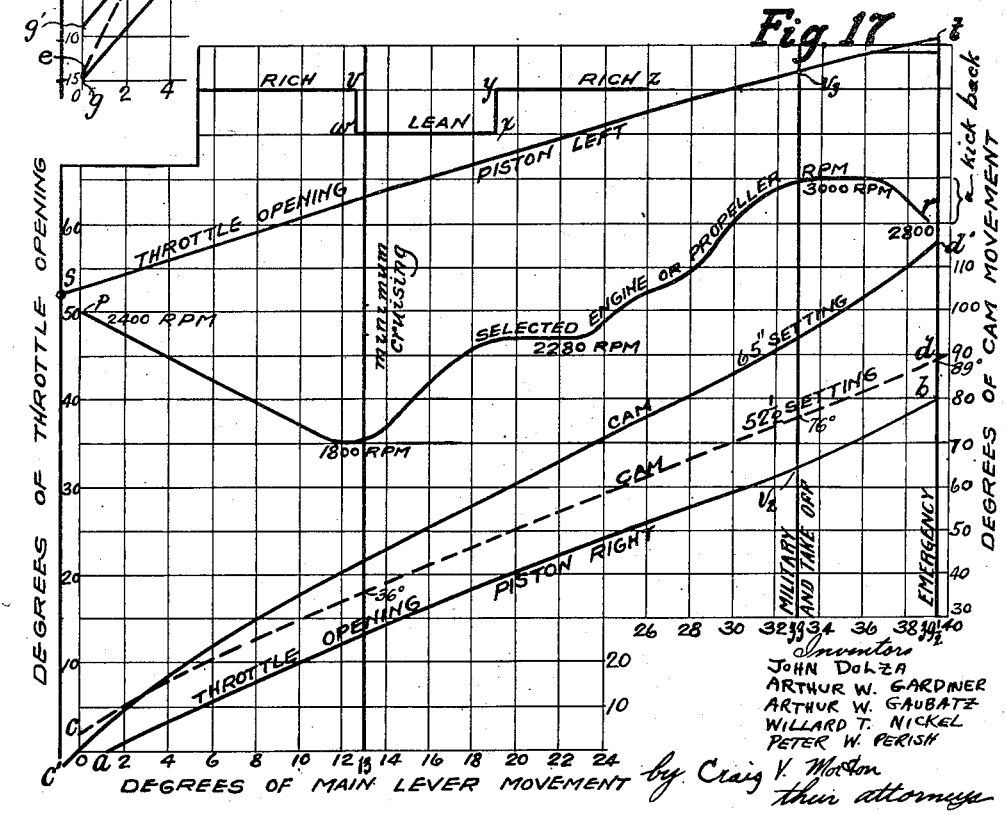

Figure 8 is a detail section on the line 8—8 of Figure 7;

Figure 9 is a detail section on the line 9—9 of Figure 7;

Figure 9a is a detail section on line 9a—9a of Figure 9;

Figure 10 is a detail section on the line 10—10 of Figure 6;

Figure 11 is a detail section on the line 11—11 of Figure 1;

Figure 12 is a detail section on the line 12—12 of Figure 7;

Figure 12a is a sectional view of a speed responsive switch;

Figure 13 is a sectional view on the line 13—13 of Figure 7;

Figure 14 is a detail section on the line 14—14 of Figure 1;

Figure 15 is a diagrammatic view illustrating the various pressure controlled mechanisms and the fluid conduits through which fluid under pressure is conveyed to the several pressure-operated devices;

Figures 16, 17 and 18a are charts showing the functions of the device;

Figure 18 is a diagram of the mode of operation of the device showing various positions of the throttle valve resulting from various positions of the main control lever of the device;

Figure 19 is a diagram showing the device connected with the pilot's control lever in the cockpit of the airplane, and the effect of moving said control lever into "emergency throttle closing position."

Figure 20 is a diagram of a certain movement of the differential lever of the device.

The framework of the device comprises two housings indicated generically by the reference numbers 2 and 4 which are secured together in any suitable way, as by bolts 6. The housing 2 is provided with mounting pad 7 adapted to be secured to the engine or to some other suitable supporting means. The pressure operated mechanism for controlling the position of the throttle valve is located within the housing 2 and the mechanism for controlling the engine or propeller R. P. M. and the fuel mixture ratio is located within the housing 4, these mechanisms operating to position the several instrumentalities controlled thereby through the medium of a system of levers principally located outside the two housings and supported thereby. Referring to Fig. 6, it will be noted that screws 10 secure to the housing 2 end plate or head 8 in which certain fluid passages are formed, for a purpose later set forth.

Referring to Figs. 1, 6 and 19, the carburetor throttle valve V is rotated by an arm 11 connected by a link 12 with the stud 13 of a differential bell crank lever 14, by any suitable form of universal joint 16. The lever 14 is enlarged to form a hub 15 to receive the outer race of a ball bearing 17, the inner race of which is supported by a stud 17a carried by an arm 18 which is secured to a shaft 20 which extends through the housing 4 and is suitably journalled for rotation therein. The housing generically designated 4 comprises two parts, 22 and 24, secured together by suitable machine screws 26 and bushings 27, which are secured between the parts 22 and 24 as shown in Fig. 12, provide bearings for the shaft 20.

The lower end 28 of the lever 14 is pivotally connected at 29 with a link 30 pivotally connected at 31 with a piston rod 32 attached in any suitable manner to a piston 34 slidable in a cylinder 36 formed in the housing 2. The piston 34 is normally held in the position shown in Fig. 6 by a spring 38 located between the piston 34 and a cylinder head 40 which is fixed in one end of the cylinder 36 and has a sleeve 42 formed at the center thereof to provide a bearing in which one end of the piston rod 32 slides. Another cylinder head 44 is located in the opposite end of cylinder 36 and has formed thereon a shoulder 46 which is engaged by a portion 48 of the section 24 of housing 4 secured to the housing 2 by screws 50. The cylinder head 44 has a centrally disposed cylindrical extension 52 in which is received a bushing 54 which provides a second bearing for the piston rod 32. A suitable packing gland 56 is provided to prevent any leakage of fluid around the piston rod.

The piston 34 and cylinder 36 constitute a servo-motor for automatically operating the differential lever 14 to move the throttle valve of the carburetor in response to movements of the piston; and oil pressure, as controlled by an automatic valve and provides the motive power for moving the piston. To effect movement of the piston, oil under pressure is supplied to a passage 60 (Figs. 1, 4, 10, 11 and 15) formed in the wall of the housing 2 from any suitable oil line leading to the engine which line may be connected at 61 (Figs. 1 and 4). At a point intermediate its ends, the oil passage 60 communicates with a short passage 62 perpendicular thereto and also formed within the wall of the housing and best shown in Figs. 6 and 11. The passage 62 communicates with an annular groove 64 formed in the outer wall of a valve guide 66 which forms the fixed part of a control valve hereinafter described in detail. The oil flows from the passage 64, as determined by the control valve, either through the orifice 68 which extends through the wall of cylinder 36 and communicates directly with the space 70 within the cylinder at the right side of the piston 34 in Fig. 6, or into the passage 72 shown in Figs. 6 and 10, from which it flows through a horizontal passage 74, shown in Fig. 10, formed in the wall of the cylinder 36 to the port 76, through which it flows through the port 76 into cylinder 36 on the left side of the piston 34, as seen in Fig. 6.

When oil under pressure is admitted through orifice 68 to space 70, the piston moves to the left and the control valve permits oil to flow from the space at the left of the piston; and, vice versa, when oil under pressure is admitted by the control valve to passages 72, 74 and 76 to cause piston 34 to move to the right while oil is permitted to flow out through passage 68. In case of failure of oil under pressure, the piston 34 is returned by the spring 38 to the position shown in Fig. 6, thus partly closing the throttle valve. Return of the throttle valve to idle position is effected by manual operation, as will be described more fully later.

The control valve includes the valve guide 66 previously referred to and a movable valve 80 slidable within the guide 66. The valve 80 is movable in a manner described more fully hereinafter by manually operable mechanism and automatically by devices movable in response to manifold pressure. The position of the valve 80 controls the flow of oil to the opposite sides of piston 32 and, therefore, controls the movement of the piston and the position of the throttle.

The valve guide 66 is fitted within a cylindrical bore 82 formed in the end wall of housing 2, the bore having a shoulder 84 formed thereon which is engaged by a flange 86 formed at one end of valve guide 66. A spring 83 located between guide 66 and part 48 of housing section 24 maintains the flange 86 against shoulder 84. As stated before, the valve guide 66 has an annular groove 64 in its outer wall which communicates with the passage 62 through which oil is supplied under pressure. Groove 64 is located between two other annular grooves 90 and 92 in the valve guide 60. Grooves 64, 90 and 92 are connected, respectively, by ports 94, 96 and 98 with the interior of valve guide 66. As shown in Fig. 10, there are a plurality of each of the several ports 94, 96 and 98 and the flow through these ports is controlled by the valve 80 which has provided on its outer surface two circumferential ribs or lands 100 and 102, which are spaced apart and have a sliding fit with the inner wall of valve guide 66. As the valve 80 is moved by means later described, the position of the lands 100 and 102 with respect to the several ports 94, 96 and 98 controls the flow of oil and the position of the piston 34, by determining which of the ports 96 and 98 are in communication with port 94.

For instance, with the parts in the position shown in Fig. 6, the valve 80 is in such a position that the ports 94 and 96 lie between the two lands 100 and 102. In this position of the parts the oil, which enters under pressure through passage 62, will flow through port 94 into the space between the wall of the valve 80 and the inner wall of valve guide 66 into passage 72, through passage 74 and orifice 76 into cylinder 36 at the left of the piston 34. This would cause a movement of the piston toward the position in which it is shown in Fig. 6. During this movement of the piston 34, any oil to the right of such piston would be forced out of the cylinder 36 through ports 98 into the space within the right end of valve guide 66 and to the right of the rib 102. This space is connected with the low pressure oil reservoir through drain passages 93, 95 and 124 (Figs. 1, 4 and 15) connected with a low pressure return to the oil reservoir.

If the tubular member 80 is moved far enough to the right for the ports 94 and 98 to lie between the ribs 100 and 102, then the oil which enters the passage 62 will flow inwardly through the port 94 and outwardly through the port 98 which communicates with passage 68 through which oil is forced into the cylinder 36 at the right of the piston 34, creating a pressure thereon which will move the piston toward the left in Fig. 6. Upon such movement of the piston, oil lying to the left of the piston is forced out of the cylinder, flowing through port 76 and communicating passages 74 and 72 into the space between the tubular element 80 and guide 66 at the left of the rib 100. This space is in communication with the interior of the main housing section 2 from which the oil flows back to the oil reservoir of the engine. To this end an orifice 120 is provided in the housing just above the cylinder 36 that connects with a substantially horizontal passage 122 which, in turn, connects with the vertical passage 124 as shown in Fig. 4. At its upper end, the passage 124 communicates with a horizontal passage 126 which opens into the space in the housing 2, as shown in Fig. 6. When the engine is in operation, oil may stand in the housing as high as the level of passage 126, but when the engine is stopped, the oil in the housing 2 runs out through orifice 120 and the housing becomes empty.

The valve 80, during most of the time when the engine is in operation, occupies a position somewhere between the two extreme positions previously described, in which the port 94 is the only one of the ports in cylinder 66 which lies between the lands 100 and 102. With the parts in this position, there can be no flow of oil and the piston 34 is in a condition of balance with no force tending to move it in either direction, at whatever position it may have occupied when the valve 80 moved to such intermediate position.

The movement of the valve 80 to different positions to perform the functions previously described is brought about partly by manual control means and partly by automatic control mechanism operable in response to changes in pressure within the engine manifold. In order to move the valve element, a rod 130 is fastened to valve 80 and clevis 132. The clevis 132 is pivotally connectd at 134 to one end of a lever 136 pivotally mounted on a pin 138. The other end of the lever is engaged by a spring 140 which is received in a bore 142 formed in the wall of the housing section 2 and lies between the end of lever 136 and a plug 141 which is threaded in the end of the bore 142. The spring 140 causes the upper end of lever 136 to be urged against a cam 144. The cam 144 is rotated manually to determine the position of one end of the lever 136 and thereby to determine the initial location of the movable valve 80, which valve is positioned also by the shifting of the pivot pin 138 of lever 136 by means (to be described) responsive to variation in manifold pressure. In order manually to rotate the cam 144, it is secured to, or may be integral with, one end of a shaft 146 as best shown in Fig. 11. The shaft 146 is rotatably mounted in a cylindrical sleeve 148 which is journalled for rotation in boss 150 formed on the wall of housing section 2. For a purpose to be referred to later, the axis of rotation of shaft 146 is normally located above the axis of rotation of the sleeve 148. The sleeve 148 is provided with a flange 152, one end of which is adapted to engage a shoulder 154 formed on the housing wall, while an operating lever 156 is secured to the sleeve 148 at the opposite end thereof; and, when the device is assembled, the shoulder 152 and the operating lever 156 which is secured to the sleeve 148 by a screw 158 prevent any longitudinal movement of the sleeve 148.

Figure 2:
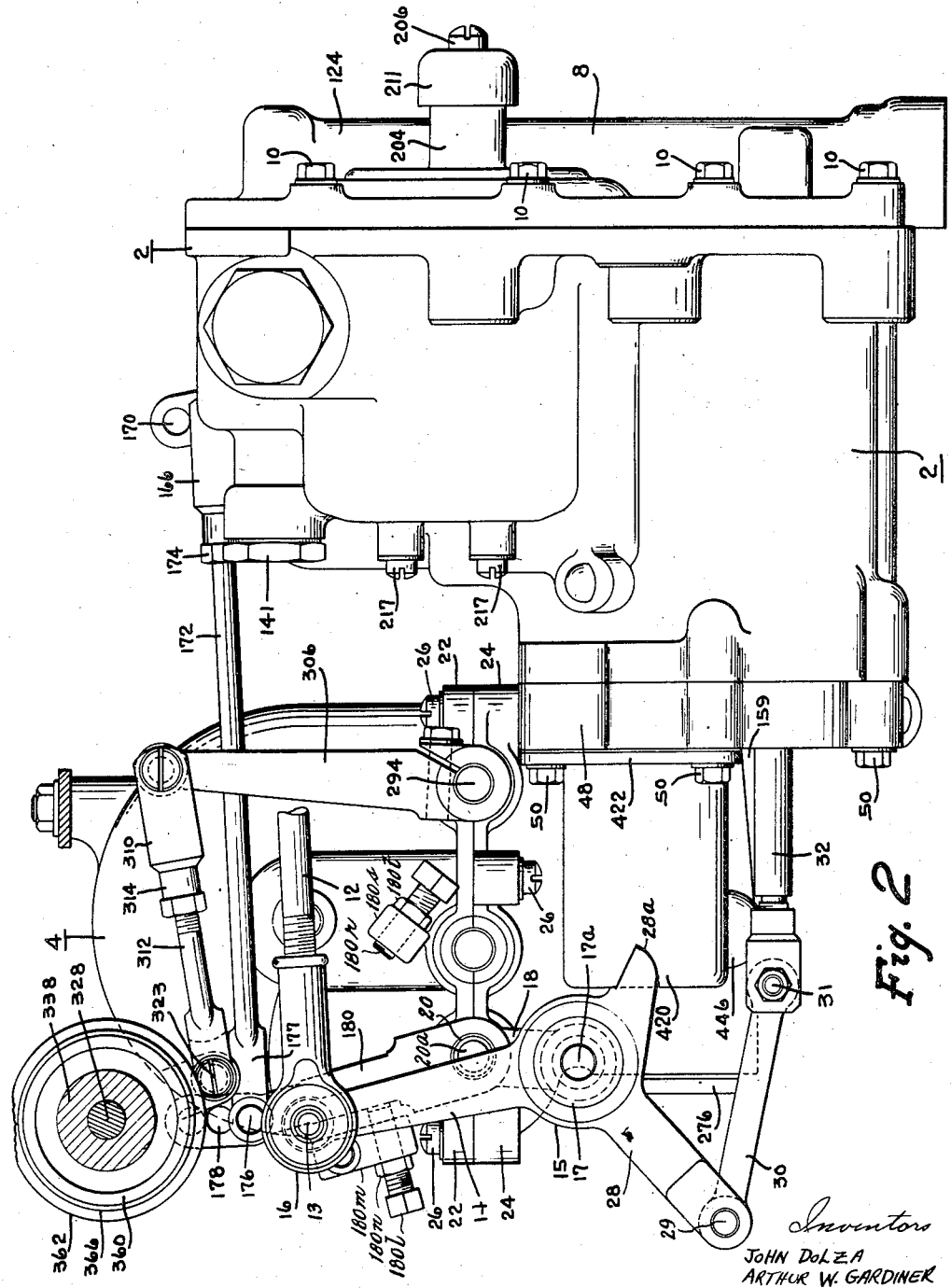
Figure 2 is a side elevation viewed from the direction opposite to Figure 1. The part shown in section is taken on line 2—2 of Figure 9.

In order to rotate the shaft 146 which carries the cam 144, the shaft has secured thereto, at the opposite end thereof, an operating arm 160 having a flat 161 engaging a corresponding flat 162 on the shaft 146. Thus, the operating arm is always secured to the shaft 146 in the same position. The arm 160 has a split clamping hub 163, which, when the arm is properly positioned on the shaft, is tightened by a clamping screw 164, so as to be secured to the shaft 146. A clevis 166 is pivotally connected to the arm 160 by pin 168 placed in either one of two holes 170 formed in the end of the arm 160. The purpose of the two holes is to vary the degree of angular movement of the shaft 160 for the same degree of movement of the clevis 166. The clevis 166 is part of a rod or link 172, which is adjustable with respect to the clevis 166 and may be set in any position of adjustment by the nut 174 (Fig. 2). The opposite end of the rod 172 is pivotally connected with a lever 180 having three holes 178, one of which may be selected to receive a pin 176 passing through a clevis 177 in the end of rod 172. Lever 180 is secured by means of a clamping screw 182 to the knurled end of the shaft 20 (left end of shaft 20 in Fig. 12), which is rotatably mounted in bearings 27 retained by the walls of sections 22 and 24 of the housing 4. The right end of shaft 20 (Fig. 12) is connected with the main control lever, designated in its entirety by numeral 186, and comprising a part 186a loosely journalled on shaft 20 and a part 186b attached to shaft 20 by a clamping screw 186c. When lever part 186a rotates counter-clockwise a spring 480 transmits motion to lever part 186b. Spring 480 surrounds a stud 481 attached to lever part 186a and extends through a hole in lever part 186b and receives a washer 482 retained by a pin 483. Pin 483 limits the separation of lever parts 186a and 186b due to the action of spring 480 which normally is under compression. The purpose of the construction of the main control lever, designated generally by number 186a, will be described later. The lever 186 (Fig. 1) has one or more holes 187 for receiving a pin by which a link may be connected leading to the pilot's control lever in the cockpit of the airplane. It will be apparent from the foregoing that, through the chain of connections described, lever 186 will move the cam 144 to whatever position the pilot may select. As shown in Fig. 6, movement of the lever 186 also causes movement of the engine throttle due to the fact that, as shaft 20 is rotated, the floating fulcrum 17a of lever 14 is rotated about the axis of shaft 20.

If the pivot 138 of the lever 136 (Fig. 6) is stationary when the movement of cam 144 takes place, the lever 136 and the valve 80 will be moved a corresponding amount. Valve 80 can be moved by movements of pin 138 along axis B—B, Fig. 6. The pivot pin 138 is carried by webs 190 integral with adjacent discs 192 and 194 to which the adjacent end edges of identical metal bellows 196 and 198 are sealed. The left end edge of bellows 196 is sealed to a disc 200 having a central stem 202 received in bore in a tubular boss 204 of housing part 8. A screw 205 passes through a plain hole in a bushing 208 threaded in boss 204 and threadedly engages the stem 202. A nut 210, threaded on bushing 208, may be screwed against the boss 204 to hold the bushing 208 in a position of adjustment for a purpose to be described. A nut cover cap 211 is secured between the head 206 of screw 205 and the bushing 208 to prevent turning the nut 210 by a wrench and moreover to conceal the nut 210, thereby making it less likely that the adjustment of bushing 208 will be disturbed after the apparatus leaves the factory. By screwing the adjustment bushing or sleeve 208 in or out, the pivot 138 can be brought into the correct position relative to the cam 144 and the assembly of valve 80 and guide 66.

The space within the bellows 196 is evacuated; and the collapsing of the bellows 196 is resisted by a heavy spring 212 and a lighter spring 214 located between the discs 192 and 200 under certain states of initial compression. The right end edge of bellows 198 is sealed to a ring 216 secured by screws 217 to housing 2, there being a gasket 218 between the housing 2 and the ring 216. Ring 216 carries a spring retainer ring 219 engaged by a spring 220 held under a certain state of normal compression between the disc 194 and ring 219. The interior of bellows 198 is connected with the engine manifold by a passage 222 in housing 2 (Fig. 15) and a suitable connecting pipe, not shown. Spring 220 opposes collapsing of bellows 198 as manifold pressure decreases.

The effective areas of the bellows 196 and 198 are equal; therefore, the sysem will not be affected by changes in pressure within housing 2. The movements of pivot pin 138 bear approximately a linear (first power) relation to corresponding changes in pressure within bellows 198. Bq proper selection of the springs 212, 214 and 270, the desired movement of the pivot 138 as a function of pressure change within bellows 198 is obtained.

The control by the lever 186 of the selection of engine or propeller R. P. M. will now be described with reference to Figs. 7, 12 and 13. Fig. 7 shows that shaft 20 (operated by control lever 186) drives a segment gear 230 which is secured to the shaft for rotation therewith and meshes with a gear 232 attached to a cam plate 234 rotatable on a stationary rod 236. Plate 234 has a cam slot designated generally by numeral 238 for receiving a follower roller 240 pivotally carried by an arm 242 integral with a yoke 244 straddling the plate 234 and integral with trunnions 246 and 248 journalled in bearings 245 and 247, respectively, carried by housing sections 22 and 24. Trunnion 246 drives an arm 250 connected by any suitable linkage (not shown) with a controller which controls the propeller pitch changing mechanism in order to obtain a desired engine or propeller R. P. M. As will be described later, when the main control lever 186 is moved the cam 238 produces such movements of the arms 242 and 250 that the relation of movement of lever 186 to the selected engine or propeller R. P. M. will be a predetermined relation best suited to the operation of the engine under certain conditions. Curve p—r of Fig. 17 is illustrative of this relation for a certain type of engine.

The control by the main control lever 186 of the richness of the fuel mixture will now be described with reference first to Fig. 7. The periphery of the cam plate 234 controls the operation of a servo piston 272, which is movable to different positions to regulate the mixture proportions in a manner to be described. The piston 272 is slidable within a cylinder 274 formed in the housing section 24. The cylinder 274 is closed at one end by a threaded plug 276 which is screwed thereinto and limits the movement of the piston toward the right, said piston being normally held in a position adjacent to the plug when the engine is not running, by a compression spring 278, received between the piston and the opposite end of the cylinder. When the engine is in operation, the piston is movable by oil pressure to determine automatically, within certain limits, the setting of the mixture control.

To operate the mixture control mechanism, the piston is secured in any suitable manner to a rod 280 slidable in a bushing 282 fixed in the housing section 24. The rod is connected at the opposite end to an arm 284 by a pin and slot connection. A slot 286 is formed in the lower end of the arm 284; and the piston rod 280 is bifurcated at the left end thereof to form a slot therein so that the slot 286 straddles the pin 288 into which the end of arm 284 projects which extends across the slot in the piston rod.

The arm 284 is secured to an enlarged hub 292 on a shaft 294 which is rotatably journalled in bushings 296 and 298, between the upper and lower housing sections 22 and 24 (Fig. 8). The end of bushing 296 is closed. The bushings have flanges 300 which are received, when the parts are assembled, between the housing sections 22 and 24 and flanges 302 and 303 on the shaft 294, so that the shaft is prevented from axial movement.

One end of shaft 294 is knurled at 304 and an arm 306 is correspondingly knurled and secured thereto by a pin 308, or in any other suitable way. At its upper end, the arm 306 is pivotally connected to an adjustable link comprising a clevis 310 and a rod 312 screwed thereinto and provided with a lock nut 314 to hold it in any adjusted position with respect to the clevis, so as to vary the length of the link as desired. The clevis is bifurcated at the end which is connected to the arm 306; and the flattened upper end 316 of the arm is received between the two parts of the clevis to which it is pivotally connected in any suitable way to permit some lateral play at the connection as well as rotation in the pivot. This rod 314 is formed with a rectangular cross-section at the opposite end and is then bifurcated to receive between the parts thereof a short flattened arm 320 which extends from a cylindrical member 322. The arm 320 is pivotally connected by a bolt 323 which has a loose enough fit with the arm to permit some lateral as well as pivotal movement.

The member 322 is rotatable on a sleeve 324, but is adapted to rotate therewith to control the fuel mixture ratio. The sleeve 324 somewhat loosely surrounds the outer cylindrical surface of an elongated nut 325 having a hexagonal socket 326 and screwed upon a stud 328 attached to a rotatable member 330 which regulates the fuel mixture setting. By tightening the nut 325, the sleeve 324 is clamped tightly against a plate 338, and the plate 338 against the member 330 so that the parts 324, 338 and 330 will rotate together. Member 330 can be rotated manually by means connected with plate 338 or automatically through a connection between arm 320 and sleeve 324. Since it is necessary to insure that the parts 324, 338 and 330 be tightly clamped together in the desired adjusted angular relation when the nut 325 is tightened, the reduced extension 332 of member 330 is provided with radial teeth 334 which engage radial teeth 336 formed on adjacent face of the plate 338. Radial teeth 340 similar to the teeth 336 are formed on the opposite side of the plate 338 and these engage corresponding teeth 342 on the flanged end of sleeve 324 so that, where the assembly of parts is clamped together, the two sets of teeth 334, 336 and 340, 342 engage to prevent any slippage between the parts 324, 338 and 330.

The connection between the arm 320 and the sleeve 324 is a yieldable connection so that sleeve 324 can override arm 320 when plate 338 is manually operated. This yieldable connection comprises a plurality of roundheaded studs 344, which are carried by a flange 346 projecting outwardly from the sleeve 324, and engage holes 348 in a flange 350 which extends outwardly from the sleeve 322. The sleeve 322 can move longitudinally with respect to sleeve 324, but is normally held in such position that the studs extend into the holes by a compression spring 352 received between the sleeve and a cup-shaped element 354 fitted on the outer surface of sleeve 324 and held against movement toward the right by a spring retainer clip 356 which is received in a groove on the outer surface of sleeve 324.

The automatic movement of sleeve 324 through actuation of arm 320 is effected by oil pressure operating through the piston 272 and controlled in a manner to be described. Means are provided, however, to rotate the sleeve 324 manually to effect a change in mixture setting in the event of any emergency which might occur or if the automatic device is disabled through failure of oil pressure or for any other reason. The manual operating means includes an annular element 360 secured to the periphery of the circular plate 338 in any suitable way, or integral therewith; and rotatably mounted thereon is a second annular element 362 having an operating arm 364 integral therewith, said arm being adapted to be connected with some suitable form of operating linkage which extends to a lever in the cockpit to be operated by the pilot, the operating linkage and lever not being shown herein.

The annular element 362 is retained between a flange 365 formed on the element 360 and split-wire snap ring 366 which engages a groove in the element 360 so that element 362 is movable only rotatably with respect to element 360. Means are provided, however, through which rotation of element 362 by its operating arm will cause a rotation of element 360, and through the plate 338 a corresponding rotation of the member 330 to effect a change in mixture setting. For this purpose, the element 360 has two lugs or teeth 368 which project radially inwardly into elongated notches 370 formed in the outer surface of the element 360, as best shown in Fig. 9a. When the lugs engage the end of the elongated notches, the element 360 is rotated with the element 362, but about 30° of lost motion are provided in which there may be relative movement between the two elements 360 and 362 before that one of those elements which is being moved can effect movement of the other element. The actual idle movement of either element 360 or 362 will depend, of course, on the position of the two elements at the time movement actually starts.

With the mechanism described, if the arm 320 is actuated by the piston 272, the mixture regulating element 330 will be moved until the lost motion provided by the lugs and notches described is eliminated before there is any tendency to move the element 362 which is connected to the manual mechanism. After the lost motion is eliminated, there will be a force applied to the element 362 and the manually operable control lever will be shifted. If the automatic mechanism fails and the manually operable lever is used to set the mixture control, the lost motion will be first eliminated and then the yieldable connection will yield to permit movement of the control member 330 without corresponding movement of its actuating arm 320.

If desired, the notches 370 can be eliminated, so that the movement of the mixture control lever in the cockpit indicates the functioning of the automatic mixture control. Then the parts 338, 360, 362 and 364 can be made integral.

As already stated, the pressure operated piston 272 is controlled in its operation by the periphery of the cam plate 234 which controls the pitch of the propeller. The cam periphery has two concentric surfaces designated by the reference number 380 and between these surfaces is a dip 382, and these surfaces cooperate with the movable element of a control valve to determine its position. The valve comprises an outer cylinder 384 which is fixed in position in a bore 385 formed in the wall of the housing section 24 and is provided with ports through which oil may flow. An oil passage 386 communicates with said bore to supply oil. This passage 386 is formed in the housing section 24 and, when the parts are assembled in proper position, registers with the high pressure oil passage 60, formed in the wall of housing section 2 and which supplies oil to the main servo piston 34.

The outer surface of cylinder 384 is provided with three grooves 388, 390 and 392, each of which communicates with one of a series of ports numbered 394, 396 and 398, respectively. There are four ports in each series, but the number may be varied. The oil supply passage 386 communicates with the groove 390, and the series of ports 396, while an oil passage 400 formed in the wall of the housing, connects at one end with groove 388 and ports 394, and at the other end with the cylinder 274, at the right side of piston 272. Another oil passage 402 connects at one end with groove 392 and ports 398, and at the other end with the cylinder 274 at the left side of piston 272.

Slidable within the cylinder 384 is a hollow valve member 404, open at its lower end and urged upwardly into engagement with the cam periphery by a compression spring 406 received within the valve member between the bottom of bore 385 and the upper end of the valve member which is closed except for plurality of oil passages 408, that connect the space within the valve member with the interior of housing sections 22 and 24 in which the operating cam is located. An oil drain passage 410 (Fig. 15) connects with the drain passage 95 in the bottom of the housing section 2 to convey oil flowing from the cylinder 274 back to the source of supply, as shown in Figs. 5 and 10.

The valve member 404 has a series of holes 412 which communicate with ports 394 and a series of grooves 414 arranged longitudinally of the valve member which are of such length as to communicate with the ports 396 at all times and with ports 394 or 398 when the valve member 404 is in its upper or lower position, respectively. The passages 408 allow oil to flow from the interior of the member 404 to the interior of the housing to be returned to the source of supply through passages 410 and 95.

The operation of the above described cam controlled valve mechanism is very simple. Throughout most of the rotation of the cam the valve member 404 is in engagement with the surface 380 which maintains said valve member in its lower position, as shown in the drawings. In this position oil under pressure enters the ports 396 and flows down the passages 414, flows outwardly through ports 398 and passage 402 into cylinder 274 at the left side of piston 272, forcing the piston to the position shown in Figs. 7 and 15. During this motion of the piston 278, the oil at the right thereof is forced through passage 400, ports 394 and 412 to the interior of the valve member 404, from which point it flows through passages 408 to the space within the housing section 22, the ports 394 and 412 being so positioned that they slightly overlap under these conditions to permit a flow of oil therethrough. With the parts in the position described, the mixture control mechanism is moved by the piston 272 to give a rich mixture which is suitable for operation under most operating conditions.

If the cam is moved to a position where the surface 382 engages the valve member 404, such member will be lifted by spring 406 to its upper position. In such position, the ports 412 are out of registry with the ports 394, but the upper ends of passages 414 have been moved into registry with the ports 394 and the lower ends of such passages are in registry with ports 396. Oil can then flow through said ports 396, passages 414, ports 394 and passage 400 to the right side of piston 272 moving such piston to the left. As the piston so moves, oil to the left thereof is forced through passage 402 into the space within member 404 and out of passages 408, the lower end of member 404 being above the edge of ports 398, to partly uncover such ports when the member 404 is in its upper position. The movement of piston 272 to the left sets the mixture control for a lean mixture.

It will be noted particularly that the control cam is positioned so that the surface 392 is engaged by valve member 404 only when the main control lever 186 is set in position to adjust the manifold pressure for cruising, this being the only operating condition when it is desirable to automatically position the mixture control mechanism for a lean mixture.

Regardless of what position the automatic control may occupy, the manually operable lever 364 may be moved by the operator at any time to adjust the mixture control to give whatever mixture is necessary for proper operation of the engine. Also, in the event of any failure of the automatic device to operate, the pilot may use the manual device to adjust the mixture as desired. It will be apparent also that the automatic device sets the mixture control in either one of two positions only, rich, if the piston 272 is at the right end of the cylinder 274, and lean, if it is at the left end of the cylinder.

The provision for manually overriding the automatic fuel-air mixture ratio selector, allows the pilot to vary the mixture at will or to cut off the fuel supply when stopping the engine. Strictly, the maintenance of a given fuel air ratio is the function of the automatic metering mechanism of the carburetor; the present device selects only whether the auto rich or the auto lean range of the carburetor is operative, this selection formerly being under control of the pilot by the so-called "mixture" lever in the cockpit.

Means are provided to prevent operation of the engine at a speed above a maxmium predetermined speed in order to prevent possible damage which might be occasioned by too high speed operation. The means to accomplish this result is a solenoid which is automatically energized when the speed reaches the predetermined speed referred to and is effective to operate the control valve for the main servo piston to cause the latter to move the throttle toward closed position. This movement of the throttle will cause a reduction in engine speed which will de-energize the solenoid when the speed is reduced sufficiently to insure safety of operation.

The solenoid is best shown in Fig. 6 and comprises a casing 420 secured in any suitable way to a base plate 422 which is secured to a part of the end plate 48 of the housing section 24 by the machine screws 50 which hold the housing sections 2 and 24 together. Within the casing 420 and insulated therefrom is a winding 426, lying between two end plates 428 and surrounding a brass tube 430 from which the winding is suitably insulated. Fixed within the tube 430 is the core 432 and slidable within the tube is the armature 434 provided with restricted ports 434a and attached to a rod 436 that extends through the core and is directly in alignment with the movable element 80 of the control valve for the main servo piston. A compression spring 438 normally holds the armature in the position shown in Fig. 6 and in which position it abuts a disc of insulating material 440. Leads 442 and 444 are connected with the winding and a suitable cable armor (not shown) for enclosing these leads is adapted to fit within the nipple 446 extending laterally from the casing 420. As shown in Fig. 15, leads 444 and 442 are connected with a speed controlled switch and a battery 445. The speed controlled switch may be of any desired form, a suitable design of switch being shown in Fig. 12A and described briefly later.

Whenever the speed controlled switch is closed, the armature 434 moves to the left and rod 436 engages the tubular member 80 of the servo control valve, such member being always at or near its limit of movement to the right when the engine speed is sufficient to energize the solenoid. Rod 436 will, in this way, move member 80 toward the left which will cause a movement of the servo piston toward the right, partially closing the throttle and effecting a reduction in engine speed. When the speed is sufficiently reduced, the solenoid will be de-energized and the armature 434 will be moved back by spring 438 to its original position as shown in Fig. 6. This movement of armature 434 is retarded by the dash pot provided by the armature, the tube 430 and the disc 440, the ports 434a in the armature providing for a retarded transfer of air. Therefore, the armature rod 436 does not release the valve 80 as soon as the speed diminishes to open the speed controlled switch. This feature is conducive to a stable operation of the automatic pressure regulator, thereby preventing the surging of the engine speed between limits above the predetermined maximum speed.

The speed control switch which is shown diagrammatically in Fig. 12A includes a shaft 450, which is driven by the engine at speeds which vary as the engine speed varies. A cup-shaped member 452, attached to the shaft 450, carries pins 454 which pivotally support weights 456 which are normally held in the position shown in the drawings by springs 458 received in recesses 460 in the weights and engaging the member 452. Each weight 456 carries a pin 462 which engages the flanged end 464 of a sleeve 466 which surrounds the shaft 450 and is slidable thereon. This sleeve may either rotate on the shaft or rotate with it. Secured in the end of the sleeve is a non-conducting button 468 which engages a resilient contact arm 470 fixed at one end to a suitable mounting 472 and normally resting against a stop pin 474. The arm 470 carries a contact 476 which is movable by the button 468 into engagement with a cooperating fixed contact 478 when the engine speed reaches a predetermined maximum and is disengaged therefrom by the inherent resiliency of the arm 470 when the engine speed drops off to a predetermined extent. The switch contacts 476, 478 are connected one with a battery 445 (Fig. 15) and one with wire 444 leading to solenoid 416. Wire 442 connects battery 445 with solenoid 416.

Rotation of the shaft 450 causes weights 456 to move on pivots 454, due to centrifugal force, and pins 462 move sleeve 466 to the right so that when the speed of shaft 450 attains a predetermined value, the button 468 engages the resilient switch arm and closes the switch. As the speed of shaft 450 decreases following energization of the solenoid and the resulting deceleration of the engine, the switch is opened. The opening of the switch causes the de-energization of the solenoid 416 and the release of valve 80 which moves toward a position for causing higher intake pressure and higher engine speed. This cycle is repeated so long as the speed of the engine tends to exceed the maximum allowable speed. The variation in speed warns the pilot that the propeller pitch controller is not working properly.

Figs. 16 and 17 are diagrams showing the mode of operation. In Fig. 17, curve a—b shows the relation of throttle opening to movements of main lever 186 when the piston 34 remains at the right end of cylinder 36. In other words, curve a—b shows the throttle opening which can be effected manually. For a particular type of engine, the throttle opens from idle position to about a 40° position, while the lever 186 moves from about the 1° position to the 39½° position. Curve a'—b' of Fig. 16 shows the corresponding manifold pressures obtainable at sea level.

The heavy located vertical line indicating the 13° position of lever 186 is where a'—b' intersects curve g—h—j—k; and this 13° line shows the minimum setting of lever 186 for obtaining full automatic control from sea level upwardly. The heavy vertical line indicating the 33° position of lever 186 and marked "military and take-off" indicates the position of the setting of lever 186 required for "take-off." The heavy vertical line indicating the 39½° position of lever 186 and marked "emergency" indicates the setting of lever 186 required for "emergency" operation.

The movements of main lever 186 cause movements of cam 144 which controls the datum of valve 80 which controls the servo which effects an opening of the throttle in addition to the opening effected by the lever 186. If the cam 144 is set to give a maximum selected intake pressure of 52½" Hg, the degrees of cam movement corresponding to degrees of lever movement are shown by curve c—d of Fig. 17. Curve e—f of Fig. 16 shows the relation of degrees of cam movement to engine intake pressure in inches of mercury (absolute). For example, movement of lever 186 to 39½° position causes movement of cam 144 to about its 89° position, Fig. 17. According to point 3 of curve e—f of Fig. 16, the 89° position of cam 144 gives a maximum pressure selection of 52½" Hg.

The throttle opening obtained by manual operation plux maximum servo operation (piston left) corresponding to various positions of lever 186 is represented by curve s—t, Fig. 17. The maximum is approximately 80° of throttle movement when the lever 186 is at the 39½° position and the servo piston is at the extreme left position. The differences between the ordinates of curves s—t and a—b (Fig. 17) represent the range of servo-piston movement to effect throttle opening in addition to that obtained by manual operation. Curve s—t shows that the intake pressure regulator is not capable of producing maximum throttle opening when pressure selections are below military power. Test work conducted on the engine under consideration indicates that, for all practical purposes, the critical altitude under (the above described) cruising and normal power conditions is not reduced to an appreciable extent. It is possible to design the controller so that the throttle valve will be fully opened at settings of the main control lever less than required for "take-off."

It will be understood that whenever the pilot operates the main control lever to select some desired pressure for take-off, cruising or other operation of the aircraft, the movement of the throttle valve to obtain that pressure is partly manual and partly automatic. The operating connections between the main lever and the throttle are such that when the lever is operated to select a pressure, the throttle is never moved all the way, to the position it must occupy to obtain the pressure selected. There is always an automatic movement of the throttle in addition to the manual movement when there is an operation of the main lever to select a pressure. After a selected pressure has been initially obtained, that pressure is maintained during operation of the aircraft at different altitudes entirely automatically without any manual movement of the throttle.

Curve g—h—j—k marked "selected pressure, 52½" setting, sea level" shows the relation between degrees of main lever movement and engine intake pressure selection for sea level operation. Pressure selection is obtained by movements of cam 144 which is moved by main lever 186. When lever 186 has moved to the 13° position, cam 144 has moved to its 36° position, as noted on curve c—d, Fig. 17. This gives a pressure selection of 20" according to point 1 curve e—f, Fig. 16. Full automatic control begins here. Hence, point h on curve g—h—j—k indicates 20" pressure selection when lever 186 is in the 13° position. When lever 186 is moved to its 33° or take-off position, cam 144 moves to its 76° position (Fig. 17) which gives a selection of 45" pressure, as indicated by point 2 on curve e—f (Fig. 17) and point J on curve g—h—j—k. When lever 186 is moved to its 39½° or emergency position, cam 144 moves to its 89° position as indicated by curve c—d (Fig. 17) which gives a pressure selection of 52½" as indicated by point 3 on curve e—f (Fig. 16) and by point k on curve g—h—j—k. That part of the selected pressure curve between h and k represents the range of automatic pressure regulation at sea level, and upwardly, when the maximum pressure to be selected is 52½".

Line n—o represents the modification of the range of pressure selection which, at sea level, is represented by $h$—$j$—$k$, this modification being due to the movement of eccentric 148 as the piston 34 moves toward the left. One advantage of this is to keep the I. M. E. P. (indicated mean effective pressure) substantially constant with variation in altitude. In case of a single speed mechanically driven super-charger, this condition would give substantial constant power independent of altitude. Another advantage of the action of eccentric 148 is the stabilization of the operation of the automatic regulator.

Curve $a'h$ shows on account of its up and down character that the pressure cannot be controlled by the automatic pressure regulator. Therefore, pressures along $a'h$ are obtained only manually by the main lever movement only. This is done by making the pressure selection curve $g$—$h$ lie well below $a'h$, while this unstable condition occurs in the engine. To the right of point $h$, the manifold pressure steadily increases with throttle opening, this being necessary in order to insure stability and prevent hunting.

Whenever possible, point $g$ should be 30" to 35" Hg, below idling intake pressure since breakage of the aneroid bellows 196 (Fig. 5) will cause the pressure selected by cam 144 to increase by atmospheric pressure. To make it possible for the pilot to close the throttle with a broken aneroid, the lowest selected pressure, when the aneroid bellows 196 is broken, should be no greater than idling pressure. In the disclosed form of the invention, if the aneroid bellows 196 were broken, the selected pressure would be according to line $l$—$m$ in Fig. 16 which is 30" Hg above $g$—$h$. Therefore, movement of the main control lever 186 to 0° position causes the intake pressure to become the value 1 which is substantially the same as value $a'$ at the left end of curve $a'$—$b'$. Therefore, the pilot has complete control of the engine throttle for landing purposes.

When the connection between link 172 and arms 180 and 160 is as shown in Fig. 1, the cam 144 will select pressures up to 52½" Hg. When the connecting pins 176 and 168 pass through holes in arms 180 and 160 other than as shown, the cam 144 will select pressures up to maximum other than 52½". For example, when pin 176 passes through uppermost hole 178 of arm 180 and when pin 168 passes through the lowermost hole of arm 160, the cam 144 will select pressures up to 65" Hg. Then the movement of the cam 144 is related to the movement of lever 186 as indicated by line $C'$—$d'$ (Fig. 17), the selected pressure will be as shown by line $g$—$h'$—$k'$; and the selected pressure with broken aneroid will be as shown by line $l'$—$m'$ in Fig. 16.

Line $p$—$r$ (Fig. 17) shows the relation between movement of lever 186 and selected engine or propeller R. P. M. as determined by cam 238. This is typical of one particular engine and may vary with different types of engines.

Line $u$—$v$—$w$—$x$—$y$—$z$ (Fig. 17) shows the relation between movement of lever 186 and the automatic rich setting and the automatic lean setting of the carburetor as determined by cam surfaces 380, 382.

Fig. 18 is a diagram showing various positions of the mechanism for controlling the position of the throttle valve $v$. The various links, rods, levers and pivotal connections are numbered with the reference numbers applied to the parts illustrated in the preceding figures. When control lever 186 is at 0° or $186_1$ position, the other parts are located in the positions indicated by subscript number 1. Pivot 17a is at $17a_1$; differential lever arms are at $28_1$ and $14_1$; link 30 is at $30_1$; link 12 is at $12_1$; throttle shaft arm $a$ is at $a_1$; and throttle valve $v$ is at $v_1$ which is idle position.

Movement of lever 186 from 0° or $186_1$ position to 33° or $186_2$ position, required for take-off (Fig. 17), causes the pivot 17a to move to $17a_2$ and the differential lever arms 28 and 14 to move to $28_2$ and $14_2$, respectively. Link 30 moves to $30_2$. Link 12 moves to $12_2$, arm $a$ to $a_2$, and valve $v$ to $v_2$ which is the 32° position as indicated by the chart (Fig. 17) at point $v_2$ where curve $a$—$b$ crosses the 33° vertical line marked "take-off." Movement of lever 186 to $186_2$ also causes such movement of the cam 144 as to cause the selection of 45" Hg intake pressure as indicated at $j$ on curve $g$—$h$—$j$—$k$ (Fig. 16) where that curve crosses the 33° or "take-off" line. Piston 34 moves toward the left to cause such further opening of valve $v$ as necessary to maintain 45" Hg pressure in the engine intake. To insure that manifold pressure at sea level does not exceed the selected value, 45" Hg for example, even under conditions giving a dynamic ram of air at the entrance of the intake system due to the forwardly projecting air scoop and high airplane speed, it is arbitrarily arranged that opening of the throttle by direct manual linkage is insufficient, even at sea level, to give the selected pressure and that, in consequence, the throttle must be additionally slightly opened by the servo-piston 34. This provides the desired margin so that the piston 34 floats off its right end stop and can maintain pressure by motions in either direction.

As altitude increases from sea level, the movement of piston 34 increases. At critical altitude, the piston 34 will have moved to extreme left position $34_3$, thereby causing link 30 to move to $30_3$ and differential levers 28 and 14 to move to $28_3$ and $14_3$, respectively, link 12 to move to $12_3$, arm $a$ to move to $a_3$ and valve $v$ to move to $v_3$ which is its 77° position which corresponds to point $v_3$ on Fig. 17, where curve $s$—$t$ crosses the 33° or "take-off" line.

Point $r$ on curve $p$—$r$ together with point $k$ on curve $g$—$h$—$j$—$k$ represents the conditions for maximum power at sea level. For example, the speed for engine maximum power for 52½" selected pressure is 2800 R. P. M. engine speed at sea level according to curve $p$—$r$. Engine critical altitude, when a mechanically driven supercharger directly connected to the engine is used, is greatest at engine maximum speed. This is 3000 R. P. M. engine speed in the engine under consideration and corresponds to a setting of lever 186 between its 33° and 36½° positions approximately.

Therefore, in order to make an emergency flight, the pilot sets lever 186 at $186_4$ or the 39½° position, thereby moving pilot 17a to $17a_4$ and the differential lever to $14_4$ and $28_4$, link 12 to $12_4$, arm $a$ to $a_4$ and valve $v$ to $v_4$ or about the 40° position. This movement of lever 186 sets cam 144 to select a pressure of 52½" Hg. As the altitude increases, piston 34 moves left and causes the differential lever arms 28, 14 to rock about their pivot $17a_4$ from the positions $28_4$ and $14_4$, respectively to positions $28_x$ and $14_x$, respectively, the corresponding position of the piston 34 being $34_x$. When piston 34 arrives at $34_x$ the tail 28a of the differential lever will have arrived at $28a_x$ (Fig. 20) wherein it just touches stud 20a of shaft 20. At the same instant, arm $a$ is at $a_x$ and valve $v$ at $v_x$ or about the 81° position. Further movement of piston 34 to $34_5$, at the extreme left in Fig. 18, which is attained at the critical altitude for the 52½" Hg pressure setting, causes the differential lever 14, 28 to pivot around the stud 20a and not the pivot 17a. Therefore, pivot 17a moves from $17a_4$ to $17a_5$, the differential lever 28, 14 moves from $28_x$, $14_x$ to $28_5$, $14_5$, link 12 moves from $12_x$ to $12_5$, arm $a$ from $a_x$ to $a_5$, and valve $v$ from $v_x$ to $v_5$ which is the 79° position. As pivot 17a is kicked back from $17a_x$ to $17a_5$, shaft 20 must move the same angular distance which is about 3°. Cam 238 (having 5 to 1 ratio with shaft 20) moves 15° which causes the speed selection to change from 2800 R. P. M. to 3000 R. P. M. The "kicking back" of shaft 20 causes a clockwise movement of cam 144 which moves to a position corresponding to the 36½° position or the $186_5$ position of lever 186. This gives a pressure selection of about 48" Hg which is safe to use when the engine speed is 3000 R. P. M. in order to attain an altitude higher than the critical for the 2800 R. P. M. and 52" Hg pressure selection.

Fig. 18a shows graphically the function of the kickback. Curve A—B—C shows the relation of propelling horsepower and altitude for engine operation at 2000 R. P. M., 52½" Hg intake pressure; and curve D—E—F shows that relation for engine operation at 3000 R. P. M. and about 48" Hg intake pressure. The ascent is made according to curve A—B. When critical altitude B is reached, a shift is made during the kick-back of differential lever pivot 17a from $17a_x$ to $17a_5$ (about 3°) from B on curve A—B—C to E on curve D—E—F so that the altitude E (higher than B) can be attained before propelling horsepower decreases appreciably. The engine can be safely operated in an emergency at a speed increased to 3000 R. P. M. and at intake pressure reduced to about 48" Hg. This shows that a rapid ascent can be made without overloading the engine until a certain high altitude is reached. Then to go higher, the engine can be temporarily "crowded" or speeded up without danger of overloading, since the intake pressure is reduced. By following this procedure of engine control, the engine will stand up under a number of emergencies greatly exceeding the number which would obtain where it is attempted to climb at maximum speed.

As stated before, lever 186, which is represented diagrammatically in Fig. 18 as one lever, is in fact a divided lever system comprising an arm 186a journalled on shaft 20 and operatively connected with an arm 186b fixed to shaft 20 by a compression spring 480 (Fig. 1). Therefore, when arm 186b is kicked back to $186_5$ (Fig. 18) while the pilot maintains the arm 186a in the 39½° position (or $186_4$ in Fig. 18) the spring 480 is compressed. When the emergency is over and the pilot causes the arm 186a to return to the 33° or military position, the arm 186b does not back up 6½° to its 30½° position, but returns to its 33° position also, because the spring 480 is permitted to expand to restore to normal the angular relation between the lever arms 186a and 186b. The spring 480 has force sufficient to control the cam 238 which effects selection of engine or propeller R. P. M., so that this selection will be at 3000 R. P. M. as the lever system 186 returns to military position.

Fig. 19 is a diagram showing the pilot's control lever 500 located in the cockpit for controlling the main control lever 186 (which in fact includes arms 186a and 186b as previously described, but which is shown diagrammatically as a single lever). Lever 500 comprises a knob 501 integral with a tube 502 attached to a toothed block or detent 503 for engaging a toothed segment 504 on a stationary sector 505. Tube 502 is slidably supported by a lever rod 506 having a head 507. Between head 507 and a plate 508 on the interior of knob 501, there is located a spring 509 which urges the knob 501 and the detent 503 upwardly to engage the segment 504. The lever rod 506 has a hub 510 pivoted on a pin 511 carried by sector 505 and is connected by link 512 with lever 186.

Depression of knob 501 is required before the lever 500 can be moved from 0° position to the 33° position, or to intermediate positions. Release of knob 501 permits detent 503 to engage the toothed part of segment 504 so that the lever 500 will remain in its 0° or 33° positions or between them. Before moving lever 500 into 39½° or emergency position, knob 501 is pressed. As the lever 500 is so moved, rod 506 which is at 506a in the 33° position of lever 500, pushes against a pad 520 urged by a spring 521 toward the right; and spring 509 pushes detent 503 against the smooth part 513 of segment 504. Therefore, the pilot is required to hold the lever 500 in emergency position. When the emergency is over, the pilot releases grasp of the lever 500, whereupon the spring 520 expands to force lever 500 to the 33° position, where it is held by the re-engagement of detent 503 with the toothed part of segment 504. Therefore, the pilot is not required to remember to restore the cockpit lever 500 to military or take-off position when the emergency ceases.

In case the controller is damaged so that piston 34 sticks and does not return to right position by spring 38, provision is made for moving the throttle valve manually to a closed position sufficient for landing.

For example, if the piston 34 were stuck at location 34' (Fig. 19) throttle valve $v$ would be in partly open position $v'$. To move the valve to idle position $v$, the knob 501 is depressed and the lever 500 is moved to $500y$, or —30° position, thereby causing the throttle valve to move from $v'$ to $v$. Therefore, the pilot can move the throttle valve to idle position.

*Résumé of advantages*

Most airplane engines have a supercharger directly driven by the engine which delivers to the manifold, air or air and fuel mixture under pressure. The supercharger is made to give the desired intake manifold pressure at the rated altitude, consequently below rated altitude the intake system has to be throttled down to prevent overboosting and serious mechanical damage to the engine. Without means of controlling manifold pressure independently from altitude, the pilot is compelled to operate the throttle as the altitude changes, this being a serious handicap on military or commercial airplanes. This handicap is eliminated by the present engine controller. All that the pilot is required to do is to move the cockpit lever 500, which shifts the main control lever 186 of the controller, to the desired position, such as idle during the warm-up period, and to "take-off" when it is desired to leave the ground. Movement of the lever 186 causes the throttle valve to open part way and the servo piston 34 of the automatic regulator moves left to effect whatever additional opening of the throttle is required to obtain the manifold pressure selected for take-off. As the plane ascends, the piston 34 moves left to cause the selected manifold pressure to be maintained in a predetermined relation to altitude. As critical altitude is approached, the selected pressure is gradually decreased below that selected at sea level, due to the action of eccentric 148, in order to maintain a substantially constant indicated mean effective pressure. The cam 144, in fact, is designed to give a pressure which is slightly in excess of the pressure selected by movement of lever 186. But, as the piston 34 moves left, a correction is made by the accompanying movement of the eccentric 148. Another advantage of this action is to produce stability of operation of the automatic pressure regulator. Hunting is substantially eliminated.

During descent the piston 34 moves right partly to close the throttle to whatever position is required to maintain the selected pressure in a predetermined relation to altitude.

Another important advantage is that the pilot can operate the throttle manually in case of failure of the automatic pressure regulator and failure of the servo piston 34 to move from its rest position, the linkage having been so constructed that the pilot can open the throttle manually to obtain nearly full power at sea level. In case of oil pressure failure when piston is at left, spring 38 will return piston 34 to the right or rest position to give the minimum throttle opening that can be effected by the automatic pressure regulator. This is done to protect the engine from immediate failure in case the oil system is damaged, while permitting the pilot to obtain adequate throttle opening for landing. In other words, take-off can be performed independently of the condition of the automatic pressure regulator. If, after taking off, the pilot finds the plane is unable to rise with adequate or proper power, he knows that the automatic pressure regulator is not operating and he can safely land since he has sufficient manual control of the throttle valve.

In case of breakage of the aneroid bellows thereby causing the selected pressure to be increased by atmospheric pressure, the pilot can close the throttle valve manually by moving lever 186 to the 0° position, which movement causes such movement of cam 144 as will bring the selected pressure of the cam 144 to point $g$ on the drooping line $g$—$h$ (Fig. 16) which is 30" Hg below 1 on curve $l$—$m$, the result being that the pressure is at $a'$ on curve $a'$—$b'$.

In case of sticking of the piston 34 to the left of its rest position, the throttle can be closed sufficiently to effect a safe landing by moving the pilot's control lever 500 to 500$y$ (Fig. 19), the "emergency throttle closing position."

In case the propeller control is not functioning properly, the engine is prevented from over-speeding by the operation of the centrifugal switch which closes when the minimum allowable speed of the engine is exceeded and connects the battery with the solenoid 426 which causes plunger 436 to force valve 80 into a position which causes piston 34 to move right to effect a closing movement of the throttle valve.

Heretofore, the coordination of manifold pressure and engine R. P. M. has been done by the pilot. A lever in the pilot's cockpit, called the governor lever, and connected with the propeller governor (which determines the propeller pitch) was used in conjunction with the engine tachometer. The pilot would move the governor lever until the tachometer indicated the desired R. P. M. This procedure proved to be too complicated and unreliable for military airplanes especially for the fighter class. Cam 238 geared to lever 186, is so constructed as simultaneously to coordinate with manifold pressure selection (effected by lever 186) the setting of the propeller governor to a predetermined R. P. M.

Another manual operation that had previously been left to the pilot has been the setting of the carburetor mixture strength, a lean mixture setting being recommended for crusing at moderate power and a rich mixture setting being required for idle and high power output. The manual setting of mixture strength has been found unreliable and a burden on the pilot. The cam surfaces 380—382, moved by lever 186, coordinate carburetor mixture strength with manifold pressure selection (effected by lever 186). The yielding connection between parts 320 and 324 provides for the over-riding of the automatic control of the mixture setting by the manual control.

When an emergency arises, the engine controller permits the pilot to use the ultimate maximum power of the engine for a short period of time. The operation of the controller in the emergency power and maximum power range can be better understood, if consideration is given to the following facts: (a) engine maximum brake horsepower at sea level and moderate altitudes usually is not developed at engine maximum speed but at somewhat lower speed called "speed of engine maximum power"; (b) engine critical altitude, when a mechanically driven supercharger directly connected to the engine is used, is greatest at engine maximum speed; (c) engine mechanical stresses usually increase with engine speed; (d) the tendency of the engine to overspeed, or run above its maximum rated speed (due to propeller pitch change mechanism lagging behind engine power change during a rapid change from part load to maximum load), usually is greater if the governor speed setting is at engine maximum speed, and it is less if the governor speed setting is less than engine maximum rated speed.

From the foregoing, it is apparent that the maximum power from the engine at a minimum engine stress condition and at the shortest duration of maximum rated speed can be obtained by the following procedure. When emergency power is called for at sea level, the main control lever is moved to the 39½° position (for example) to select (a) manifold maximum pressure allowable for engine operation, which 52½" Hg in the example given heretofore; (b) engine R. P. M. corresponding to maximum power which is 2800 R. P. M. in the example given heretofore (see Fig. 17). As critical altitude (B on curve A—B—C of Fig. 18a) is approached for the speed of engine maximum power (2800 R. P. M.), the controller automatically selects (c) the maximum rated engine R. P. M. which is 3000 R. P. M. in the example given heretofore, and the critical altitude is increased to E on curve D—E—F of Fig. 18a.

Since at emergency power, the life of the engine is relatively short, we provide means, the spring 521 of Fig. 19 which automatically returns lever 186 to "take-off" or "military" position in case the pilot forgets to return the lever 186 after the emergency ceases. Therefore, the pilot must hold the cockpit lever 500 in emergency position. To permit of change from "speed of maximum power" (2800 R. P. M.) to "maximum rated speed" (3000 R. P. M.) lever 186 comprises the arms 186$a$ and 186$b$ and an intermediate spring 480 which is compressed as arm 186$b$ is "kicked back," to modify the selection made by the pilot as altitude requires it. This construction of the lever assembly 186 also allows the pilot to exert positive action in closing the throttle and positive action in opening the throttle up to military power and in selecting engine maximum R. P. M. When the pilot releases the cockpit lever 500 after holding it in emergency power position, spring 521 returns it to "take-off" or "military position," while spring 480 is operating to restore the normal angular relation between lever arms 186$a$ and 186$b$, thereby causing the selected engine R. P. M. to remain at maximum engine speed, 3000 R. P. M. in the example given.

During engine operation the bellows 196 and 198 are kept submerged in oil to dampen vibration. Oil enters the housing 2 in which these bellows are located when being discharged from cylinder 36 and out through the left end of guide 66 directly into housing 2, or out through the right end of guide 66 and through passage 82$a$ (Fig. 15) into the housing 2. To reduce the back pressure caused by the discharge of oil from the regulator to the engine, a drain hole 120 (Fig. 6) of restricted size is provided. This hole 120 is small enough to permit the bellows chamber to fill up to the overflow passage 126 while the engine is operating. When the engine stops, the oil drains back to the oil reservoir of the engine through passages 121, 120 and 124 (Fig. 6).

The gear box (in parts 22 and 24, Fig. 7) is kept drained to prevent oil leaks from the bearing bushings such as 296, 298 (Fig. 8); but discharge oil from the orifices 408 of valve 404 will spray oil over the moving parts housed in the gear box.

Valve 404 has a land 404$a$ which restricts oil flow when shifting from rich to lean. This feature is to prevent the carburetor from going through the lean setting when the throttle is being moved rapidly from idle to high pressure selections, otherwise improper engine acceleration and back-fire might occur.

There are six each of the ports 96, 94, 98 (Fig. 6) in guide 66. One of the ports 98 is greater in diameter than the width of land 102 of valve 80 so that one port 98 is never completely closed by valve 80. This provides a leak past valve 80 so that oil may circulate continually to prevent congealing of the oil in the regulator while the engine is running.

The mixture control cam surfaces 380—382 and the governor control cam 238 are arranged so that, at idle (which may represent the throttle position when gliding), the mixture is at automatic rich and the governor is set at low enough R. P. M. selection (2400 R. P. M. in the example given according to Fig. 17), to prevent overspeeding the engine when there is a sudden change in the setting of the regulator to give engine maximum power. The R. P. M. setting is high enough to obtain the proper braking during descent for landing.

The instrument embodying the present invention provides a manually set automatic controller having but one manually operated control lever. This instrument accomplishes the control which heretofore required the manipulation of three levers and the reading of two indicators, specifically, the manipulation of a throttle lever, a mixture control lever and a propeller pitch control lever, and the reading of a pressure gauge and a tachometer. The pilot is relieved of the burden of coordinating lever settings with indicated pressures and speeds.

In the claims which follow, the term "manifold pressure" or "intake pressure" refers to the pressure of the combustion medium which is introduced into the engine cylinder, which pressure affects the indicated mean effective pressure of the engine. These terms apply regardless of the nature of the means for conducting the combustion medium to the engine. The regulator of the present invention is connected anywhere with the means which carries the combustion medium whether it be a manifold, supercharger scroll or the engine itself.

While the embodiment of the present invention as herein disclosed, constitutes a preferred form, it is to be understood that other forms might be adopted, all coming within the scope of the claims which follow.

What is claimed is as follows:

1. Apparatus for controlling the intake pressure of an aircraft engine, having in combination, a valve for variably restricting the intake in order to control the intake pressure, a pressure operated servo-motor for variably positioning said intake restricting valve, a control valve for regulating the action of said servo-motor, means responsive to variations in pressure and operable upon changes in altitude of the aircraft to operate said control valve in order to cause operation of the servo-motor and a movement of the intake restricting valve thereby so as to maintain approximately some predetermined selected pressure at various different altitudes, a selector cam for controlling the operation of the control valve and movable to different positions to select any desired pressure to be maintained, a second servo-motor operable to adjust the fuel mixture ratio to either enrich or lean the mixture as the selector cam is moved to different positions, a second cam for controlling the operation of said second servo-motor, a propeller governor for controlling the pitch of the propeller, a manually operable member for controlling the action of said governor, a control lever, and operating connections from said lever to both said cams and said manually operable member whereby the propeller governor and fuel mixture control means are operated in coordinated relation with the pressure selecting means in all positions of said pressure selecting means.

2. Apparatus for controlling the intake pressure of an aircraft engine, having in combination, a valve for variably restricting the engine intake in order to control the intake pressure, pressure responsive means for automatically moving said valve to different positions to maintain some selected pressure as the aircraft is operated at different altitudes, a selector member manually movable to different positions to select a pressure to be maintained and automatically movable under certain operating conditions to modify the pressure maintained with respect to that manually selected, an operating lever for said selector member, formed of two parts, one of which is connected to the selector member and the other of which is adapted to be set in position manually to select a pressure, said parts being relatively movable, so as to permit some movement of the selector member automatically without disturbing the manual setting of the other part.

3. Apparatus for controlling the intake pressure of an aircraft engine, having in combination, a valve for variably restricting the engine intake in order to control the intake pressure, automatic means movable in response to variations in pressure upon changes in altitude for moving the valve to different positions as the altitude changes in order to maintain a relatively constant selected pressure in the engine intake at different altitudes, a selector member operable to control the action of said automatic means and movable to different positions to select any desired pressure to be maintained, a manually operable lever adapted to be operated by the pilot to position said selector member, said lever being movable beyond its normal operating range to effect an emergency setting of the selector member, means for retaining the lever in set position within the normal operating range and ineffective when said lever has been moved to the emergency position, and means for returning the lever from its emergency position to the normal operating range when said lever has been moved to emergency position by the operator and is released.

References Cited in the file of this patent

UNITED STATES PATENTS

| | | |
|---|---|---|
| 2,088,954 | Gregg | Aug. 3, 1937 |
| 2,138,100 | Howard | Nov. 29, 1938 |
| 2,169,267 | McCullough | Aug. 15, 1939 |
| 2,217,364 | Halford et al. | Oct. 8, 1940 |
| 2,336,844 | Buck | Dec. 14, 1943 |
| 2,708,426 | Gardiner et al | May 17, 1955 |

FOREIGN PATENTS

| | | |
|---|---|---|
| 439,681 | Great Britain | Dec. 6, 1935 |

UNITED STATES PATENT OFFICE

CERTIFICATE OF CORRECTION

Patent No. 2,833,356                              May 6, 1958

Arthur W. Gardiner et al.

It is hereby certified that error appears in the printed specification of the above numbered patent requiring correction and that the said Letters Patent should read as corrected below.

Column 4, line 27, for "formed" read -- forced --.

Signed and sealed this 23rd day of September 1958.

(SEAL)
Attest:

KARL H. AXLINE
Attesting Officer

ROBERT C. WATSON
Commissioner of Patents